United States Patent
McCann et al.

(10) Patent No.: US 9,374,359 B2
(45) Date of Patent: Jun. 21, 2016

(54) GENERATING A DATA DISPLAY IN VIEW OF USER ACTIVITIES

(75) Inventors: William Jon McCann, Cambridge, MA (US); Cosimo Cecchi, Cambridge, MA (US)

(73) Assignee: Red Hat, Inc., Raleigh, NC (US)

( * ) Notice: Subject to any disclaimer, the term of this patent is extended or adjusted under 35 U.S.C. 154(b) by 2 days.

(21) Appl. No.: 13/478,986

(22) Filed: May 23, 2012

(65) Prior Publication Data

US 2013/0318582 A1 Nov. 28, 2013

(51) Int. Cl.
*G06F 3/048* (2013.01)
*H04L 29/06* (2006.01)
*G06F 21/41* (2013.01)
*G06F 17/30* (2006.01)

(52) U.S. Cl.
CPC ...... *H04L 63/0815* (2013.01); *G06F 17/30126* (2013.01); *G06F 21/41* (2013.01)

(58) Field of Classification Search
USPC .................................. 707/827; 709/220, 213
See application file for complete search history.

(56) References Cited

U.S. PATENT DOCUMENTS

| | | | |
|---|---|---|---|
| 6,275,944 B1* | 8/2001 | Kao et al. .......................... | 726/36 |
| 7,518,620 B2* | 4/2009 | Faraj ............................... | 345/629 |
| 8,359,331 B2* | 1/2013 | Petri ...................... | G06F 17/301 707/780 |
| 2002/0059288 A1* | 5/2002 | Yagi et al. ...................... | 707/102 |
| 2002/0065946 A1* | 5/2002 | Narayan ......................... | 709/315 |
| 2003/0105759 A1* | 6/2003 | Bess et al. ......................... | 707/9 |
| 2004/0267870 A1* | 12/2004 | Rozmus et al. ................ | 709/200 |
| 2005/0096048 A1* | 5/2005 | Clare et al. ...................... | 455/433 |
| 2008/0040790 A1* | 2/2008 | Kuo .................................. | 726/12 |
| 2009/0327904 A1* | 12/2009 | Guzak ................... | G06F 3/0482 715/738 |
| 2010/0138514 A1* | 6/2010 | Charbonnier .................. | 709/216 |
| 2010/0287219 A1* | 11/2010 | Caso et al. ..................... | 707/827 |
| 2012/0179732 A1* | 7/2012 | Caso et al. ..................... | 707/827 |
| 2012/0185725 A1* | 7/2012 | Peters et al. .................... | 714/6.2 |
| 2012/0240073 A1* | 9/2012 | McCann ................ | G06F 3/0482 715/775 |
| 2012/0278873 A1* | 11/2012 | Calero et al. ....................... | 726/7 |
| 2012/0331108 A1* | 12/2012 | Ferdowsi et al. ............. | 709/219 |
| 2013/0124995 A1* | 5/2013 | Kelley ........................... | 715/718 |

OTHER PUBLICATIONS

Shimonski, Robert. "How to implement Single Sign-On with the Terminal Services role". In VirtualizationAdmin.com [onine], Feb. 13, 2008; [retrieved on Jun. 8, 2013]. Retrieved from the Internet: <http://web.archive.org/web/20100117125050/http://www.virtualizationadmin.com/articles-tutorials/terminal-services/security/enable-single-sign-on-sso-windows.*

(Continued)

*Primary Examiner* — Jason K. Gee
*Assistant Examiner* — Zhimei Zhu
(74) *Attorney, Agent, or Firm* — Lowenstein Sandler LLP

(57) ABSTRACT

A method and system for collecting, aggregating, and displaying type specific content in an inbox like view are described. An inbox manager collects information about data objects that are stored locally and stored remotely. This information may be stored as inbox information on a local computing system. Using the inbox information, the inbox manager creates an inbox view of merged inbox items from the local data objects and the remote data objects. The inbox view is configured to display the inbox items as being merged into a single view regardless of where the respective data objects are stored.

18 Claims, 22 Drawing Sheets

(56) References Cited

OTHER PUBLICATIONS

Microsoft, "How to stop the !New tag from appearing when you add items to your SharePoint Team Services and SharePoint Services Web site", May 10, 2007, retrieved online <http://web.archive.org/web/20070510143752/http://support.microsoft.com/kb/825510>, retrieved on Jul. 6, 2015.*

* cited by examiner

| Sources | Documents |
|---|---|
| | New and recent |

Sources
- All △
- Google △
- My Private Cloud △

New and recent

Today

Kylle Tickets     PDF    local

Monadnook Map    PDF    Google    Shared with All

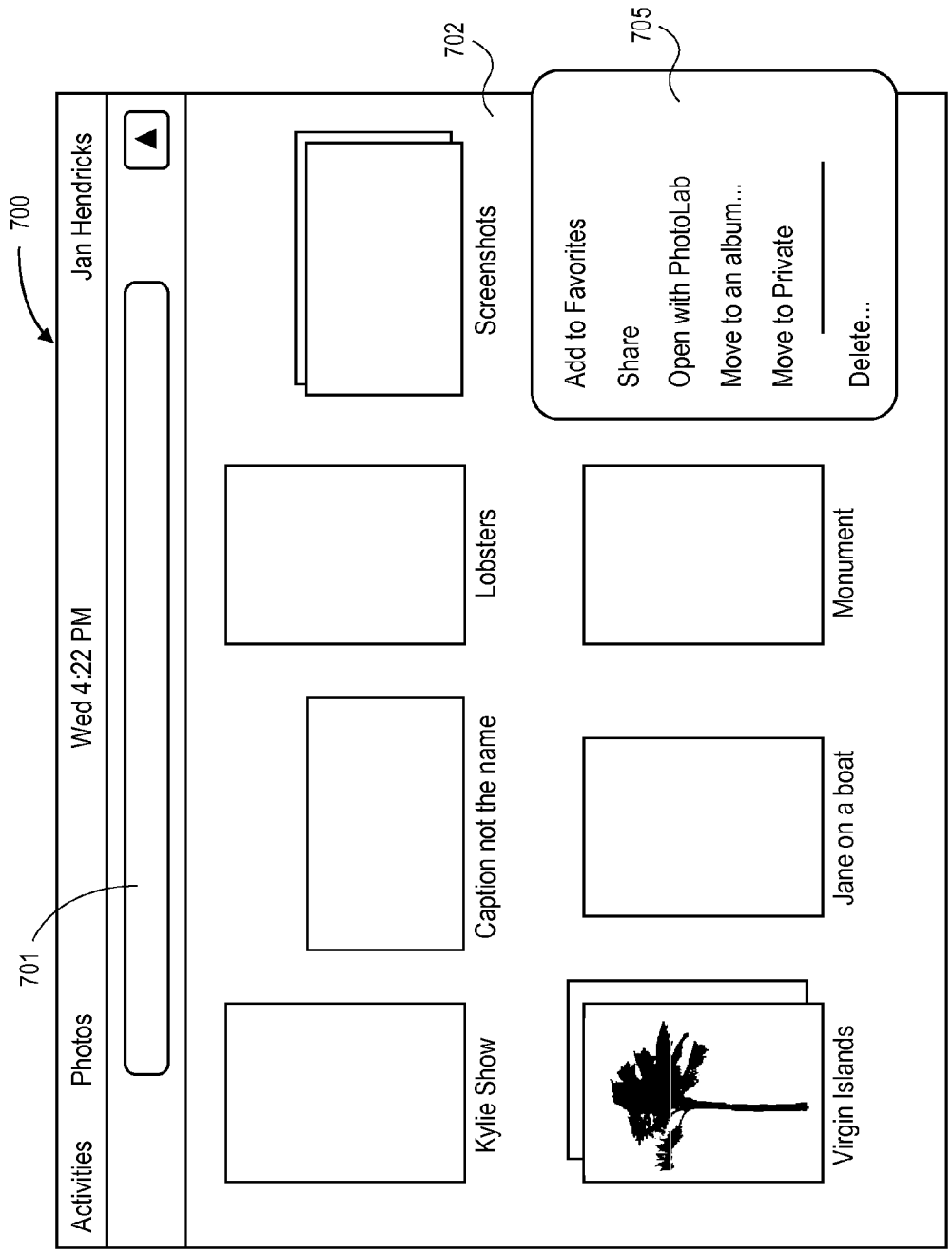

GENERATING A DATA DISPLAY IN VIEW OF USER ACTIVITIES

TECHNICAL FIELD

Embodiments of the present invention relate to collection, aggregation, and display of type-specific content in an inbox like view, and more specifically, to collecting, aggregating, and display documents, music, videos, and photos in inbox like views.

BACKGROUND

It is important for a computing environment to provide a simple and effective way to find, organize, and be reminded about content and data. This may be a complicated and difficult problem; one the industry has been struggling with for almost 40 years. Finding refers to re-finding something that has already been seen—intentional/conscious retrieval. This is a bit different from the task of web searching for something new. Reminding refers to the establishment and use of cues (usually visual) that assist or supplement memory—opportunistic retrieval. Some have referred to the problem as that of "keeping found things found."

Some functional evaluation frameworks classify three types or sets of information: 1) ephemeral—has a short shelf life and includes items such as unread electronic mail messages (emails), "to do" lists, note pads, memos, calendars, items to print out, forms to fill out, bills to pay, and news articles downloaded from databases; 2) working—is frequently-used information that is relevant to the user's current work needs and that has a shelf life that depends on the lifetime of the project, such as a day or two, a week, or months; and 3) archived—may have no shelf life, but is only indirectly relevant to the user's current work, and is infrequently accessed. These items do not disappear or become worthless, but they fade from relevance gradually. These functional evaluation frameworks have also identified a number of factors that may be used to evaluate information retrieval systems: 1) portability of information, 2) number of access points, 3) persistence of information, 4) preservation of information in its current state, 5) currency of information, 6) context, 7) reminding, 8) ease of integration, 9) communication and information sharing, and 10) ease of maintenance.

Many computing environments offer a number of tools that attempt to address aspects of the general problem. These often include: desktop (folder), places (folders or collections), search functions, recently used lists, a file manager (e.g., Explorer or Finder), file open/save dialogs (also referred to as file chooser dialogs). Other studies have shown that email, although originally designed as a communications application, has increasingly been used for task management and personal archiving. Some email applications define a few types of information that are kept around and not dealt with immediately, including to-do items, to-read items, items of indeterminate status, ongoing items over a period, and record or history. These may be viewed as another formulation of the three types or sets of information described above.

Conventional computing environments typically store files in file directories of a file system. These conventional computing environments provide a file manager, such as Explorer or Finder, to allow a user to access, view, open, save, create, or modify files in the file system. These conventional computing environments typically provide an inbox view, which is a visual representation of files that are stored in a desktop folder in the file directory. These desktops may be helpful for permanently or temporarily storing files of interest. In general, there are three types of users in these computing environments: 1) "no filers"—never file or categorize information into folders; 2) "spring cleaners"—attempt to file information (often ineffectively) after the organization system has broken down; and 3) "frequent filers"—make strenuous efforts to organize information. Organization information in these computing environments, however, has a number of problems with filing in general. In particular, it is a cognitively difficult task, there are desires to postpone filing judgments, folders may be too small, folders may be too big, folders may be too numerous, and may drastically reduce the reminding function.

Some conventional cloud storage services provide networked online storage where data is stored on virtualized pools of storage, which are generally hosted by third parties. The data center operators virtualize the resources and a web service application programming interface (API), or other web-based user interface, may be used to access the cloud storage services. A user may have multiple accounts to multiple cloud storage services. However, when multiple cloud storage services are being used, each cloud storage service uses a different interface that accesses only the files stored on the respective cloud storage service. As a result, a user may have to use multiple interfaces to locate, view, open, or modify files that are stored locally and remotely.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIGS. 6A-6H illustrate an exemplary GUI, including a document inbox view, according to one embodiment.

FIGS. 7A-7D illustrate an exemplary GUI, including a photo inbox view, according to one embodiment.

DETAILED DESCRIPTION

Figure 1:
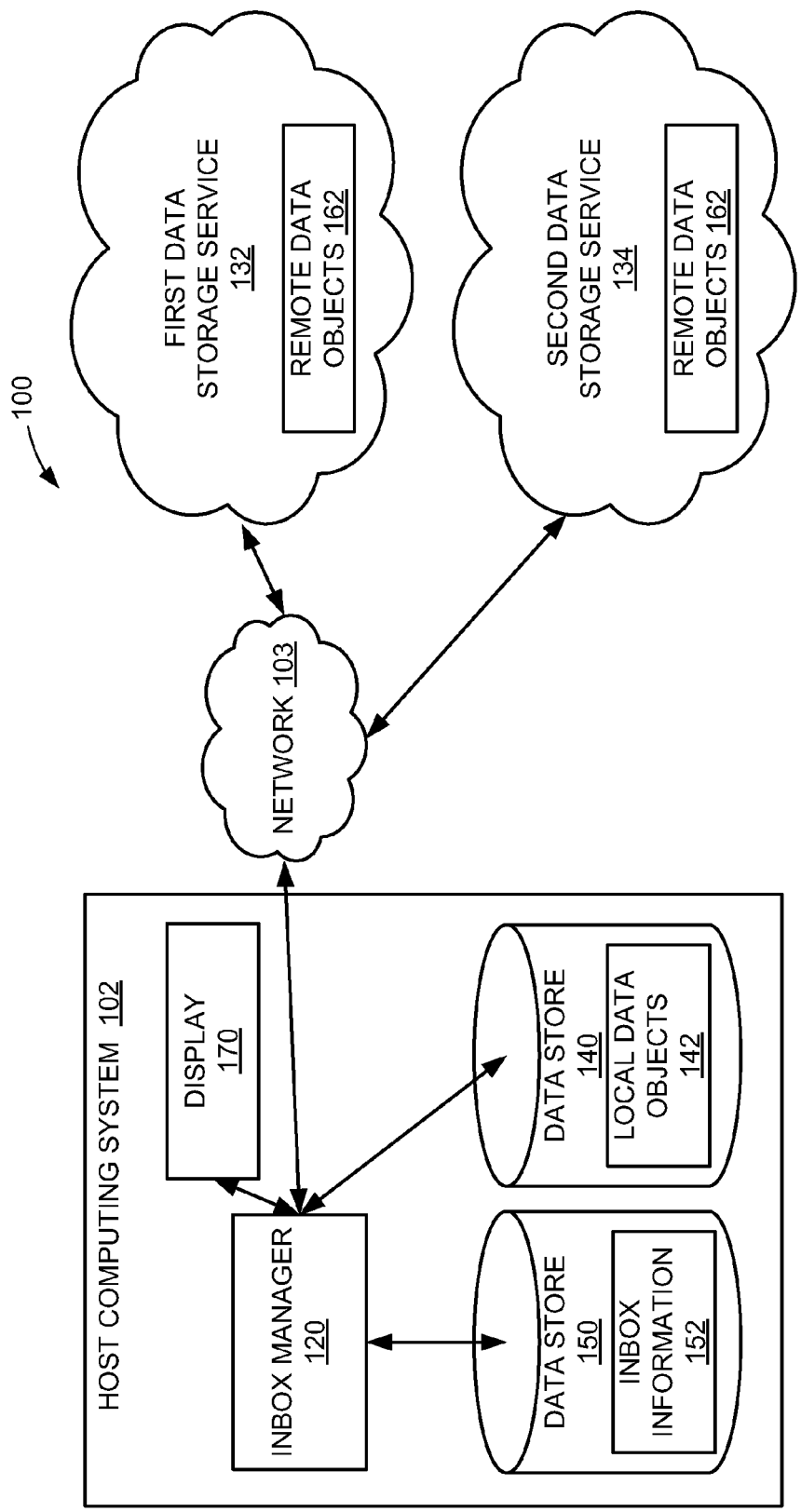
FIG. 1 is a block diagram of an exemplary network architecture in which embodiments of an inbox manager may operate.

A method and system for collecting, aggregating, and displaying type specific content in an inbox like view are described. In one embodiment, an inbox manager collects information about data objects that are stored locally and stored remotely. This information may be stored as inbox information on a local computing system. Using the inbox information, the inbox manager creates an inbox view of merged inbox items from the local data objects and the remote data objects. The inbox view is configured to display the inbox items as being merged into a single view regardless of where the respective data objects are stored. It can be said that the single view is a single interface to view, select, and modify data objects regardless of where the data objects are actually stored. The data objects may be any data that is encapsulated, such as a value, a variable, a function, a program, or a data structure that can be processed by a computing system, such as file system objects, objects of databases, files, applications, scripts, instant message conversations, blog entries, social media posts, music, videos, photos, documents, files, portions of a file, and other data as would be appreciated by those of ordinary skill in the art having the benefit of this disclosure. The data object may be the file itself or may be data objects stored within a file.

In one embodiment, the inbox information about each of the data objects includes some metadata, such as a creation timestamp, a last-accessed timestamp, a last-modified timestamp, a calendar event, a reminder event, or a follow-up date. Alternatively, the inbox information may be other information about the data objects, such as a reminder data, due date data, to-do data, to-read data, category data, reoccurring event data, or record or history data associated with the respective data objects. The inbox manager presents a graphical user interface (GUI) on a display, the GUI displaying at least a portion of the inbox view of the inbox items. The GUI may present the view in at least one of a list view, a thumbnail view, an icon view, or a menu view. For example, the view may be a list of inbox items. The GUI may be presented in at least one of a file browser (e.g., MS Explorer, Mac OS Finder, or other file chooser applications), a web browser, a viewing area of an application, or a working area (main view) of the computing system's display. The GUI may be displayed within a window, which is a visual area of the display containing some kind of user interface. The GUI displays the output of one or more processes and allows input to be received from the user for those processes. The GUI can be manipulated by the user using a mouse cursor, and can receive input view a keyboard, a mouse, a touchpad, or other user input devices. The GUI may include other graphical objects, such as a menu-bar, toolbars, controls, icons, or the like. It should also be noted that the GUI may be represented in one or more windows. Alternatively, the inbox view may be presented as a main view of the computer's display, such as the background of the display that can be covered at times by windows that have been opened. Also, as described herein, the GUI may provide an activities view as the background and the inbox view can be a window that opens on top of the activities view.

As described above, it is important for a computing environment to provide a simple and effective way to find, organize, and be reminded about content and data. The embodiments described herein provide an improved computing environment that provides a simple and effective way to find, organize, and be reminded about content and data via an inbox view. The inbox view may be a document inbox view, a photo inbox view, a video inbox view, or another inbox view for other categories or types of data objects. The embodiments described herein can be used to aggregate data objects, stored both locally and remotely, and stored in multiple types of remote data storage services, into a single inbox view. The single inbox view can be used as a single interface to interact with the data objects despite those data objects being stored locally, as well as those data objects being stored remotely. A user, using the embodiments described herein, can identify and provide access credentials for multiple online cloud computing services and cloud storage services, and the embodiments can collect information on the data objects to present a GUI with an inbox view of these data objects. For example, a user may have a DropBox® account, a Google Docs account, and an iCloud® account, and the inbox manager can present a single interface view of the data objects stored at these different online accounts, as well as the data objects that are stored locally. Further, the inbox manager can present a single interface view of a specific type of data objects. For example, the inbox manager can aggregate and merge the documents (e.g., Microsoft Word®, Excel®, PowerPoint® documents, LibreOffice documents, PDF documents, or the like) from these different sources and present the merged documents in a single view despite the documents being stored in multiple locations, both locally and remotely on one or more online storage services. Similarly, the inbox manager can aggregate and merge photos, music, or videos each into single views of the respective types. The embodiments described herein are not limited to documents, music, videos, and photos, but these are common data objects that are widely used by users of online storage services. The embodiments described herein can also be extended to interface with other online services, such as social networking websites that typically host documents, music, videos, photos, and the like. For example, a user may have local files stored on a client computing system and remote files stored on the Google Docs service, the Yahoo® service, and the iCloud® service. The inbox manager, using the online identifiers and login credentials for these respective services, can collect information about the data objects regardless of where stored, and present a single user interface or single inbox view that displays the local files merged with the remote files from the online services. The inbox manager does not copy the remote files, but may include links between the inbox items and its actual content. This may be provided by mapping an identifier of the inbox item in a database to a URI of its real representation regardless of whether the actual content is stored remotely or locally. When selected, the inbox manager can retrieve a copy of the remote file, and then can store a modified copy of the remote file to the online service when closed, for example. In this manner, a user does not have to worry about looking for files in different locations, such as a file manager, and online accounts, and does not have to look for remote files in different browser interfaces of the different online services. For example, instead of opening up a browser and your file manager to find a document in one or two different locations, the inbox manager presents an inbox view in a single interface that aggregates the files from those multiple sources, one being local and another one being online and then maybe even a third being a second online source. The inbox manager can operate without or with minimal user interaction.

In the following description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the embodiments of the present invention.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "mounting," "flagging," "generating," "communicating," "capturing," "executing," "defining," "specifying," "creating," "recreating," "processing," "providing," "computing," "calculating," "determining," "displaying," "detecting," "sending," or the like, refer to the actions and processes of a computing system, or similar electronic computing systems, that manipulates and transforms data represented as physical (e.g., electronic) quantities within the computing system's registers and memories into other data similarly represented as physical quantities within the computing system memories or registers or other such information storage, transmission or display devices.

Embodiments of the present invention also relate to an apparatus for performing the operations herein. This apparatus may be specially constructed for the required purposes, or it may comprise a general-purpose computing system specifically programmed by a computer program stored in the computing system. Such a computer program may be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

FIG. 1 is a block diagram of exemplary network architecture 100 in which embodiments of an inbox manager 120 may operate. The network architecture 100 may include a host computing system 102, which hosts the inbox manager 120, and two or more remote data storage services 132, 134, which are each connected to the host computing system 102 via one or more networks 103. The one or more networks 103 may each be a private network (e.g., a local area network (LAN), wide area network (WAN), intranet, etc.) or a public network (e.g., the Internet). The host computing system 102 may be one or more machines including one or more computers, desktop computers, laptop computers, gateways, cellular phones, personal digital assistants (PDAs), and other portable or non-portable computing devices. In one embodiment, the host computing system is a client-computing device. In another embodiment, the host computing system 102 is a server of an enterprise, but is a "client" with respect to the other network devices. The remote data storage services 132, 134 may be one or more machines including one or more server computers, gateways, routers, switches, or other network computing devices. In one embodiment, the remote data storage services 132, 134 may be data storage services, such as Google Docs, Dropbox® service, HyperOffice® service, Box.net® service, iCloud® service offered by Apple of Cupertino, Calif., FilesAnywhere® service, CloudMe™ service, CrashPlan service, Egnyte service, Mozy service, SpiderOak service, SugarSync service, TitanFile service, Ubuntu One service, Windows Live® SkyDrive® service, Wuala® service, ZumoDrive® service, Yahoo® services, Sharepoint® services, Google® drive, or the like. Google Docs is a free, web-based office suit and data storage service offered by Google of Mountain View, Calif. Google Docs allows user to create and edit documents online, and allows users to collaborate in real-time with other users. Google Docs is considered "software as a service" office suite. Documents, spreadsheets, presentations can be created with Google Docs, imported through the web interface, or sent via email. Documents can be saved to a user's local computer in a variety of formats (ODF, HTML, PDF, RTF, Text, and Microsoft Office). Documents are automatically saved to Google's servers to prevent data loss, and a revision history is automatically kept so past edits may be viewed (although this only works for adjacent revisions, and there is currently no way to find and isolate changes in long documents). Documents can be tagged and archived for organizational purposes. The service is officially supported on recent versions of the various types of browsers, including Firefox, Internet Explorer, Safari, and Chrome browsers running on Microsoft Windows, Apple OS X, and Linux operating systems. Google Docs is one of many cloud computing document-sharing services. Dropbox® is a web-based file hosting service operated by Dropbox, Inc. that uses cloud storage to enable users to storage and share files and folder with other across the internet using file synchronization. The iCloud® service is a cloud storage and cloud computing service from Apple, Inc. The iCloud® service allows users to store data such as music files on remote computer servers for download to multiple device such as iOS-based devices, and personal computers running various operating systems, such as Mac OS® X or Microsoft Windows® operating systems. The services listed above are mostly document or storage providers. The embodiments described herein may be used to accommodate other types of providers for music, photos, videos, or the like. For example, the embodiments can be used to interface with services such the Google Play service, Flickr® service, the YouTube® service, or the like.

In one embodiment, the host computing system 102 has data stores 140 and 150, which are configured to store local data objects 142 and inbox information 152, respectively. The data stores 140 and 150 may be separate databases, and may reside on one or more of the same or different storage devices (e.g., the computer-readable medium described above) that are local to the host computing system 102, remote from the host computing system 102, or a combination of both. In one embodiment, the data stores 140 and 150 are stored in the same storage device of the host computing system 102. In one embodiment, the local data objects 142 are stored in a file directory according to a file system used by an operating system of the host computing system 102, and the inbox information 152 is stored in an index that allows for quick searching and retrieval of the inbox information 152 about the local data objects 142 (as well as the remote data objects 162 described below). In another embodiment, the local data objects 142 and the inbox information 152 are stored in a single database. In another embodiment, the local data objects 142 are not stored according to the file system of the host computing system 102, but are stored using other storage schemes as would be appreciated by one of ordinary skill in the art having the benefit of this disclosure.

In one embodiment, the remote data storage services 132 and 134 includes data storage device, which may be configured to store remote data objects 162 for the host computing system 102. The remote data objects 162 can be stored in a database or other type of data store, and may be stored according to a file system of the remote computing system or some other file system of the data storage service. In yet another embodiment, the network architecture 100 includes remote data storage services 132, 134, which are configured to store remote data objects 162 for the host computing system 102. The remote data storage services 132, 134 may include one or more storage devices. The remote data objects 162 can be stored in a database or other type of data store, and may be stored according to a file system or according to blocks or other logical units of data as would be appreciated by one of ordinary skill in the art having the benefit of this disclosure.

The host computing system 102 interacts with the remote data storage services 132, 134, by exchanging messages via one or more communication protocols, such as using a network interface of the host computing system 102.

The host computing system 102 includes a processing device (not illustrated in FIG. 1) that executes the inbox manager 120. The processing device may be one or more general-purpose processing devices such as a microprocessor, central processing unit, or the like. More particularly, the processing device may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device may also be one or more special-purpose processing devices such as an application specific integrated circuit (ASIC), a field programmable gate array (FPGA), a digital signal processor (DSP), network processor, or the like. The processing device is configured to execute the processing logic (e.g., inbox manager 120) for performing the operations and steps discussed herein. The operations of the inbox manager 120 are described in more detail below with respect to FIGS. 2, 3, 4A-4B. The inbox manager 120 may be a stand-alone application that executes on the host computing system 102 or may be integrated into the operating system of the host computing system 102. By integrating the inbox manager 120 into the operating system, the inbox manager 120 may more easily monitor operations being performed on the local data objects 142 and remote data objects 162 by the operating system and other applications executing on the host computing system 102.

In the depicted embodiment, the host computing system 102 includes a display 170 on which the inbox manager 120 can present GUIs. The GUIs allow a user to interact with the inbox manager 120, such as to view the inbox items, create and add labels to inbox items, to specify parameters for updating, synchronizing, modifying the inbox items, metadata of the inbox items, and configurations of the GUIs, such as user preferences as would be appreciated by one of ordinary skill in the art having the benefit of this disclosure.

Figure 2:
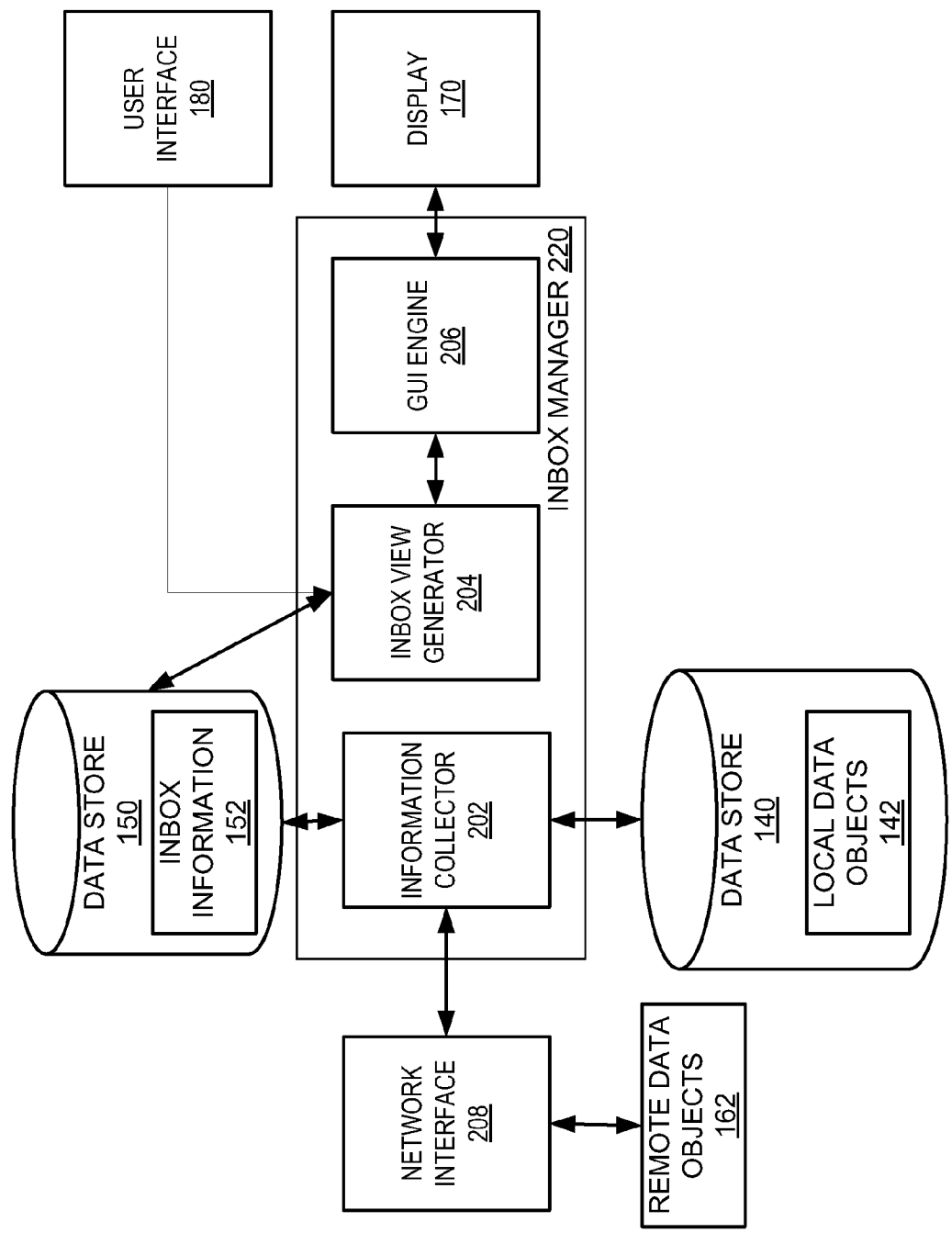
FIG. 2 is a block diagram of the inbox manager according to one embodiment.

FIG. 2 is a block diagram of the inbox manager 220 according to one embodiment. The inbox manager 220, which is executed by the processing device, performs various functions as described in various embodiments below. The inbox manager 220 may be integrated into the operating system of the host computing system 102. The inbox manager 220 may also be a stand-alone application. However, when integrated as part of the operating system, the inbox manager 220 can be one or more processes that are always running when the operating system is running. The inbox manager 220 can monitor activities being performed on data objects in order to maintain and present current information and to allow searching, indexing, and organizing of the inbox items.

In the depicted embodiment, the inbox manager 220 includes an information collector 202, an inbox view generator 204, and a GUI engine 206. The information collector 202 is communicatively coupled to the data stores 140 and 150.

The information collector 202 is configured to collect information about the local data objects 142 (and/or the remote data objects 162) and store the information as inbox information 152 in the data store 150. In one embodiment, the information collector 202 uses Tracker, which may include an indexer, a search tool, and command line tools. The indexer is a lightweight daemon that extracts information from data objects (e.g., tracker-store) and stores the extracted information in an index. The tracker search tool may provide a GUI object that allows the user to search the indexed data. The command line tools can be used for searching, querying the daemon status, and can be used for tagging inbox items (or the data objects themselves) as described in more detail below. A tag, which is a textual label, can be assigned to any data object to help organize and remember the data object. Tags may be a one-word label, or can be freeform text that allows multi-word labels. Tags can be tracked like other metadata, which can be extracted from within the data object. Tags may be chosen by the user, may be automatically assigned, or may be automatically supplied as default tags. A user can assign as many tags to a data object as desired and rename or delete the tags later. The information collector 202 can monitor applications, disk access requests, etc, to keep up-to-date information about the data objects associated with the host computing system 102. During monitoring, the information collector 202 extracts information about these data objects, such as when was the data object created, when was it last modified or saved, when was it last accessed, how frequent the data object has been accessed, or other metadata about each of the data objects, and stores the information as inbox information 152 in the data store 150. The information collector 202 can create an index of the data objects and store the metadata, including the inbox information 152 about those local data objects 142 stored in the data store 140 and/or remote data objects 162 in the remote data storage services 132, 134.

In one embodiment, the inbox view generator 204 accesses the inbox information 152, such as the index created by the information collector 202, to generate inbox views. In one embodiment, the inbox view generator 204 generates a link for each of the inbox items to be displayed in the GUI; each link referring to one of the data objects stored in the local or remote storage (e.g., local data store 140 or remote data storage services 132, 134). In other embodiments, the inbox view generator 204 may generate an inbox view that includes links for both local data objects 142 and remote data objects 162 regardless of the storage locations of the local data objects 142 and the remote data objects 162. As described above, the links may be achieved by mapping an identifier of the inbox item in the database to a URI of the data objects real representation. In effect, the inbox view is configured to display the inbox items as being merged into in a single view regardless of where the respective data objects are stored. The links may be an icon, a thumbnail, a shortcut, an alias, a Uniform Resource Locator (URL), a Uniform Resource Identifier (URI) or other types of links as would be appreciated by one of ordinary skill in the art having the benefit of this disclosure. An icon, also referred to as a computer icon, is small pictogram used in GUIs to supplement the presentation of textual information to the user. A thumbnail is a small visual representation of the contents of the respective data object, as would be shown in a display. A shortcut is a small file containing a target URI or GUID, the name of a target program file that the shortcut represents, or a target file, a target data object, or a target directory. The shortcut may also have additional parameter information that can be passed to the target program, data object, or file when it is selected. For example, Microsoft Windows® operating systems use .lnk as the filename extension for shortcuts to local files and .URL for shortcuts to remote files, web pages, or other remote resources. Generally, double-clicking a shortcut is intended to be the same as double-clicking the application or file to which it refers. Some Unix based operating system may use .desktop files to point to local or remote files, folders, and applications. Mac OS® operating systems may use aliases as links that point to local or remote files, folders, and applications. A URI is a string of characters used to identify a name or a resource on the Internet. A URL is a URI that specifies where an identified resource is available and the mechanism for retrieving it.

In one embodiment, the inbox view generator 204 can create an inbox view of inbox items based on the inbox information 152. For example, the inbox view generator 204 generates an inbox view of inbox items that shows inbox items for multiple subcategories, such as currently opened documents, new and recent items, items accessed or created today, favorite items, projects, items shared, or the like.

In the depicted embodiment, the GUI engine 206, which is in communication with the inbox view generator 204, generates a GUI on the display 170. The GUI may be an inbox view itself or may include a link to open an inbox view. The GUI engine 206 presents at least a portion of the inbox view of inbox items in the GUI. In one embodiment, the inbox view generator 204 generates an inbox view, and the GUI engine 206 presents the GUI having inbox view, such as the document inbox views illustrated in FIGS. 6A-6H, the photo inbox views illustrated in FIGS. 7A-7D, and the music inbox views illustrated in FIGS. 8, and 9A-9C. In another embodiment, the inbox view generator 204 generates an inbox view that is not necessarily organized according to the inbox information 152, but some other system-defined or user-defined criteria, and the GUI engine 206 presents the inbox view in the display 170.

In one embodiment, the information collector 202 collects inbox information for the local data objects 142 stored in a first database and remote data objects 162 stored in a second database (or multiple remote databases). The first database may be a file system of the host computing system 102, while the second database may be another database that stores remote data objects 162 for the host computing system 102. Similarly, one separate database per remote data storage service could be maintained as would be appreciated by one of ordinary skill in the art having the benefit of this disclosure. As described above, the remote data objects 162 may be stored in the remote data storage services 132, 134, and the information collector 202 may collect information about the remote data objects 162 over the network 103 via the network interface (not illustrated in FIG. 2).

In another embodiment, the inbox manager 220 includes a labeling manager. The labeling manager may be configured to receive user input from the user via the user interface 180 to filter the inbox items according to the labels (also referred to as tags). In one embodiment, the inbox view generator 204 generates the inbox view (or not), and the labeling manager filters the inbox view according to a set of one or more defined labels. The labels may be a set of default labels, a set of user-defined labels, or a combination of both. The set of labels may include at least one of a new label, a frequently-used label, an important label, a shared label, a favorite label, a document label, a picture label, a music label, a video label, a webpage label, an email label, a conversation label, a downloads label, a to-do label, or a follow-up label. Alternatively, the set of labels may be other labels as would be appreciated by one of ordinary skill in the art having the benefit of this disclosure. The user interface 180 may be integrated with the display 170 or may be separate. For example, as the user selects an existing label in the inbox view, the labeling manager receives user input via the user interface 180. The user input may instruct the labeling manager to filter the inbox view, generated by the inbox view generator 204. The GUI engine 206 can update the inbox view in the GUI on the display 170 as would be appreciated by one of ordinary skill in the art having the benefit of this disclosure.

In one embodiment, the information collector 202 collects inbox information 152 and label information about the data objects, and stores the inbox information 152 and the label information in the data store 150. The label information includes zero or more labels assigned to each of the data objects. In another embodiment, the labeling manager is configured to collect the label information, instead of the information collector 202. The label information may be stored in the index containing the inbox information 152 or may be stored in its own index. Exemplary labels are illustrated in the exemplary inbox view 602, illustrated in FIG. 6, including new, frequent, starred, shared, documents, music, videos, pictures, downloads, conversations, from email, and trash. Alternatively, other labels may be used for the default labels or for user-defined labels.

The labeling manager can receive user input to define the set of labels, to modify the set of labels, to add new labels, and to manually assign labels to inbox items. In another embodiment, the labeling manager is configured to scan the data objects (local or remote data objects) or metadata associated with those data objects to automatically determine and assign appropriate labels to the inbox items without user interaction or with minimal user interaction. For example, the labeling manager may be configured to automatically assign a document label to files with previously identified file extension types (e.g., .odt, .doc, .docx, .xls, etc). Similarly, the labeling manager may automatically assign music, video, pictures, emails, conversations, or the like based on the file extensions. The labeling manager may also be configured to automatically assign a download label to any item that is downloaded via, for example, a web browser, or a FTP application. The labeling manager may automatically assign other labels based on the filenames, the file extensions, content within the files, metadata associated with the files, the inbox information 152, as well as other information associated with a data object as would be appreciated by one of ordinary skill in the art having the benefit of this disclosure.

In one embodiment, the labeling manager is configured to receive user input to perform operations on inbox items, such as to add a star designation, add an existing label, add a new label, or even add a note to at least one of the inbox items. For the "add star" designation, the labeling manager adds a star label to one or more selected inbox items. The starred item denotes a meaning a user assigns to that star designation, but could be a relative importance of the inbox item. For example, the inbox view may include all inbox items for today, but the starred items could be listed first with a star designation, identifying those data objects as having a greater relative importance than other inbox items in the current inbox view. For the "add existing label" operation, the labeling manager assigns the existing label to the selected inbox item. The labeling manager can also re-filter the inbox view after the operation. For the "add new label" operation, the labeling manager creates the new label, and then assigns the new label to the selected inbox items. The labeling manager can add the new label to set of existing labels, and can re-filter the inbox view according to the updated set of labels. For the "add note" operation, the labeling manager adds a note to the selected inbox item by storing the note to the selected one or more inbox items in the data store, such as part of the index of the inbox information 152, or as part of the labeling information stored in the data store 150.

The inbox manager 220 may be configured to operate to combine documents, photos, music, videos, or other files from different sources, such as local file systems, desktops, search results, places, and recently used lists into one view that may dynamically change over time. Much like an inbox for email, the inbox view for these files can be used as a place to stage items that need to be addressed, viewed, modified, or the like. The inbox view can allow a user to view, open, and modify the data objects regardless of where the data object is actually stored. The places may be achieved by a default set of labels or tags that can be used as filters in the inbox view, as described herein. The inbox manager 220 can also provide enough abstraction from the underlying file system that the inbox manager 220 could transparently include non-local resources (e.g., remote data objects) in the same view as local resources (e.g., local data objects), as described herein. The inbox manager 220 may also provide enough abstraction to include information that is not file-like, for example, the inbox manager 220 may display an instant message conversation or other data objects that are not file-like. In one embodiment, the inbox manager 220 can stack similar or related inbox items so that they do not clutter the inbox view. The inbox manager 220 may also allow a user to access their desktop or file system from the host computing system 102, to access social media sources of the data object, as well as from other remote locations, such as from a second computing system over the network (e.g., the remote data storage services 132, 134 via the network 103). The inbox manager 220 may also present an inbox view that is not hidden behind all of the user's activities on the host computing system 102. The inbox manager 220 may also allow a user to easily share inbox items with others, and allows everything in the archive to be readily searchable and have rich contextual metadata. The inbox manager 220 may also allow a user to import different kinds of items as an inbox item. As described herein, the inbox manager 200 may allow the user to tag, star, and make other notes about content directly from the inbox view.

Figure 3:
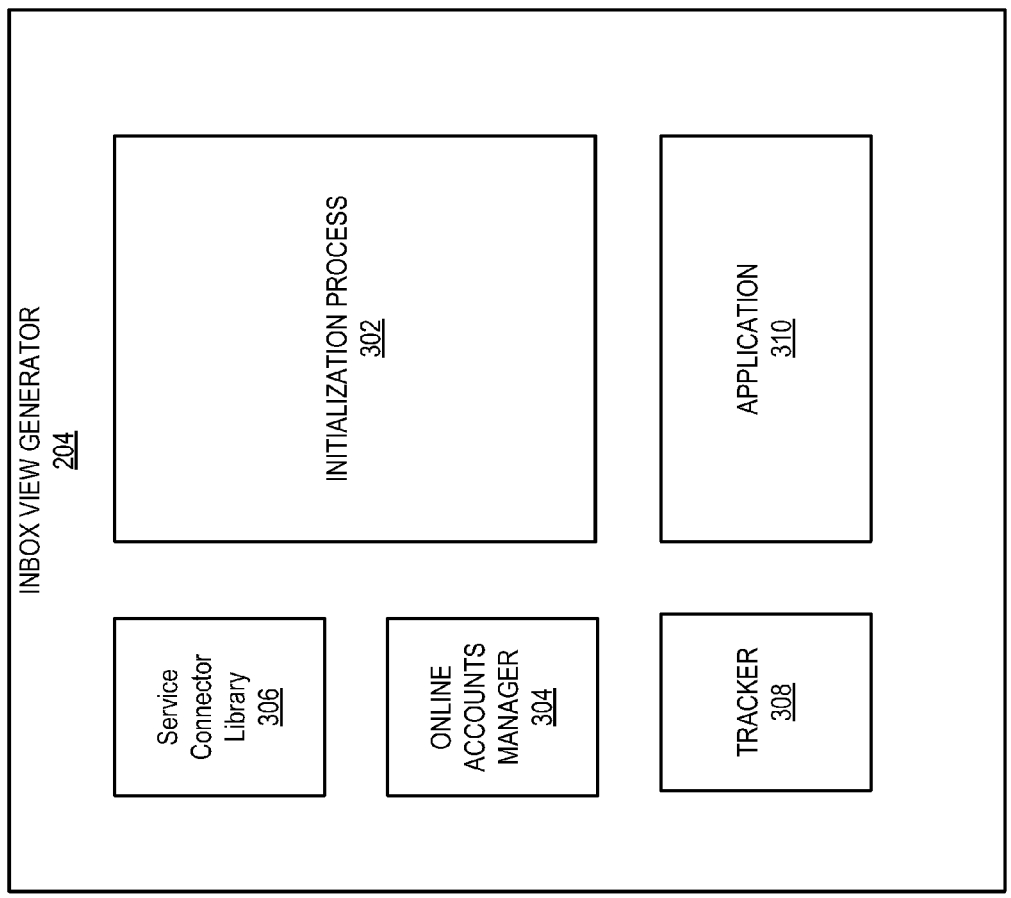
FIG. 3 is a block diagram of the inbox view generator according to another embodiment.

FIG. 3 is a block diagram of the inbox view generator 204 according to another embodiment. The inbox manager 204 includes an initialization processor 302, online accounts manager 304, a service connector library 306 (e.g., libgdata is the service connector library used for Google Docs services), and a tracker 308. In the depicted embodiment, the tracker 308 and online accounts manager 304 are illustrated as part of the inbox manager 204. However, in some embodiments, the tracker 380 and online accounts manager 304 are outside of the inbox manager 204 and communicate with the inbox manager 204 over D-Bus or another Inter-Process communication (IPC) technology as would be appreciated by one of ordinary skill in the art having the benefit of this disclosure.

As illustrated in FIGS. 1 and 2, the inbox view generator 204 is configured to be executed on the host computing system 102. The host computing system 102 may be a client machine, and may even be a server machine. The inbox view generator 204 can authenticate with one or more server machines of the online storage services. Once the inbox view generator 204 authenticates with a server and receives credentials for access, the inbox view generator 204 can reuse those same credentials for every request to the server, such as when retrieving information about the data objects stored on the respective server or when retrieving the data object itself for download or for preview. In one embodiment, the inbox view generator 204 creates a document list, a music list, a photo list, a video list, or the like, and caches one or more of these lists locally. As illustrated in FIG. 3, three different components interact with one another. Since online storage services use different authentication mechanisms, these different authentication mechanisms can be accessed by the service connector library 306 described below. Also, because a user may have three different sets of access credentials, such as user name and password combinations, the different sets of access credentials can be stored in the online accounts manager 304. The online accounts manager 304 may receive user input, such as when setting up the inbox view generator, including the user name and passwords for the different online accounts that the user may have. The online accounts manager 304 may allow the operating system of the computing system 102 to store single sign-on credentials, and can offer an interface to applications (either through an IPC mechanism or through a library interface) to retrieve account credentials for the respective online accounts. The accounts can support a document service and can have a stable ID property. For example, the GoogleProvider OAuth-based object can be used to provide authentication for access to the Google Docs account for the user. The online accounts manager 304 can be used as a tool to put in usernames and passwords for the online accounts, and these credentials can be protected using a global password in the user's desktop keyring password management system, or using single sign-on credentials. The online accounts manager 304 can be a desktop wide or a system wide service that stores all of these different login credentials. So ideally a user could run this process once to setup the online accounts, such as when you install the inbox view generator 204 or when installing the operating system. Of course, the online accounts could be modified, deleted, and additional online accounts could be added. For example, a user may setup a Google account, a Facebook account, a DropBox® account, or the like, and the user would enter the access credentials for each of these accounts. These credentials are stored in the keyring password management system for later use by all the interested clients. Also, for each account added, the online accounts manager 304 can specify which types of data objects are supported by the online accounts. For instance, with a Google account, the online service may support mail, contacts, documents, picture, and other services that can be accessed on the Google account. The online accounts manager 304 may also specify different categories of data objects that the online service can accept and handle. By using the online accounts manager 340, the initialization process 302, which is described below, can ask for some or all of the services of certain type or services that support certain media type, and the online accounts manager 304 can operate with the service connector library 306 to get those specified types.

The service connector library 306 may handle the network traffic for the inbox view generator 204. The service connector library 306 is a library that the application 310 can use to access the online resources, such as the Google Docs service. The libgdata is the service connector library that supports Google Docs data. However, the service connector library 306 may support other online services or separate libraries may be used to support other online services, such as remote data storage services. In the depicted embodiment, the service connector library 306 abstracts the online service's API into a library that can be used by the application 310. The application 301 may a document viewer application, a music application, a video application, a photo application, or other applications that present an inbox view of merged inbox items from data objects that are stored locally and remotely. The service connector library 306 also may include an authentication object that allows custom authentication objects that use the credentials managed by the online accounts manager 304. Similarly, the authentication object could be implemented as a plug-in for another service. The service connector library 306 uses the credentials of the online accounts manager 305 for every network request. This allows the inbox view generator 204 to authenticate the user without continual user interaction. In effect, the inbox view generator 204 automatically authenticates the user for access to the remote data objects stored on the remote data storage services. In one embodiment, the library service connector library 306 can use the C/GObject library for querying the Google web services. The service connector library 306 can be an XML API, and can allow the inbox view generator 204 to query the Google Docs service using the DocumentsService object. The service object may use pluggable Authorizer objects for authentication.

The tracker 308 may be a local database that maintains the metadata of the local and remote objects. This tracker 308 may run in a user session, and offers both a way to store arbitrary data and provides an expressive way of querying back the data. For example, the tracker 308 may use a Resource Description Framework (RDF) and a query language such as SPARQL, which is a type of RDF query language, to query the information stored by the tracker 308. SPARQL is a query language for databases that is able to retrieve and manipulate data store in the RDF format. The RDF is a family of World Wide Web Consortium (W3C) specifications that were originally designed as a metadata model for conceptual description of modeling information that is implemented in web resources, using a variety of syntax formats. The RDF data model is similar to classic conceptual modeling approaches, such as entity-relationship or class diagrams, as it is based upon the idea of making statements about resources (in particular Web resources) in the form of subject-predicate-object expressions. These expressions are known as triplets in RDF terminology. The subject denotes the resource, and the predicate denotes traits or aspects of the resource and expresses a relationship between the subject and the object. For example, one way to represent the notion "The sky has the color blue" in RDF is as the triple: a subject denoting "the sky," a predicate denoting "has the color," and an object denoting "blue." RDF is an abstract model with several serialization formats (i.e., file formats), and so the particular way in which a resource or triple is encoded varies from format to format. In another embodiment, the tracker 308 can have an ontology that specifies a DataSource entity type, and the DataSource can be linked to RemoteDataObject entries.

In one embodiment, the tracker 308 stores references to both the local data objects and the remote data objects. For example, the reference to the remote data object may be a remote URL to retrieve documents, or other types of files or data, from the respective online account. The application 310 retrieves the URL to the remote data object from the tracker 308, and uses this URL to load the remote data object according to the URL stored in the tracker 308. In effect, the application 310 does not need to know, and does not necessarily know whether the URL is local or remote. As a result, the application 310 can merge the data objects into a single view, such as an inbox view or a single interface, regardless of whether the data objects are actually stored. The tracker 308 allows the local data objects and the remote data objects to share the same properties from the application's perspective. The application 310 can use the service connector library 306 to retrieve metadata over the network about the remote data object, or the remote data object itself when downloading or viewing the remote data object in the application 310. In one embodiment, the tracker 308 is an index containing references to whatever the identified data object is. For example, if the data object is a Microsoft Word® file, the index would store a URL to where the document is stored, and the URL can be a local reference or could be a network reference, such as the URL where the document is hosted by an online service provider. The tracker 308 can also store metadata about the data objects, including an account ID to identify which online account the data object belongs. The account ID can be used to identify which credentials in the online accounts manager 304 should be used to retrieve the data object for the application 310. The metadata may also include an author, data created, data modified, as well as a reference back to the identifier of the account in the online accounts manager 304. The application 310 can use the identifier to identify which access credentials should be used. In effect, the online accounts manager 304 can act as the authoritative source to obtain the credentials needed to establish connections to different services. In one exemplary embodiment, a document may include a reference to account 123, and the online account 123 in the online accounts manager 304 maps to a document on the Google Docs service. This way, the application 310 doesn't necessarily need to know that it is handling document on the Google Docs service.

It should be noted, that the application 310 doesn't need to know the nature of each of the online providers using the service connector library 306, the online accounts manager 304, and the tracker 308.

The initialization process 302 is a process that uses the service connector library 306, the online accounts manager 304, and the tracker 308 to collect information of local and remote data objects for generating and presenting an inbox view of merged local and remote data objects. The following is an exemplary process performed by the initialization process 302.

GoaClient→GoaObject list
get GoaOAuth from GoaObject
  new GdataAuthenticator (GoaOAuth)
  new GdataService (authenticator)
service→query all entries
  calls into Authenticator which provides OAuth secrets
return all entries
translate the Gdata output into SPARQL queries
  Tracker
create Resource GoaObject.Id in the database
store RDF triplets for RemoteDataObjects
signal changes on the Resource D-Bus interfaces
  Application
listen for changes on Tracker Resource D-Bus interface
query the changed resources and add/remove from the view Alternatively, other operations of the process may be performed as would be appreciated by one of ordinary skill in the art having the benefit of this disclosure. In the above example, the initialization process 302 begins by asking the online account manager 304 (also referred to as a gnome-online-account (GOA) client) for all the configured accounts, and the online accounts manager 304 returns a list of GOA objects. The initialization process 302 can determine if the GOA objects support authentication, can interact with the service connector library, and then can determine if the GOA objects a document (or music, video, or photo file) supports authentication. The initialization process 302 creates a service connector library authenticator using the information from the GOA object, and then creates a service connector library service, which is the object that does the queries using the authenticator. After creating the service connector library service, the initialization process 302 passes the authenticator to the service and the services is asked to query all the entries from the remote server. At this point, the network traffic happens, and the authenticator provides the credentials from the GOA object, and the entries are returned from the remote server. The entries returned by the remote server are translated into a format understandable by the tracker 308 (e.g., RDF) and then stored in the database once translated. The initialization process creates an ID of the corresponding account for every entry returned by the remote server. The translated entries contain a reference to the ID, and are stored in the database, for example, as RDF triplets type Remote-DataObjects. The database emits signals when somebody adds data to it, such as by signaling changes on the resource D-Bus interface. The application 310 can listen for changes on the Tracker Resource D-Bus interface, and refresh the view by querying the changed resource. For example, a document may appear in the view as soon as the entry is queried from the database.

It should be noted that the inbox view generator 204 may not download the actual document, but rather the metadata about the document, including the document type, a URL to its location. This metadata may be returned in an XML file. The returned metadata, however, may be other types of formats based on the protocol used by the remote server. The format used, however, may be abstracted by the service connector library 306. The metadata can be stored as RDF triplets for the local and remote data objects. Using RDF, you can create a resource in the database. The resource is unique, and is identified by an URI unique relative to the underlying store. Once the resource is created, the resource can be used as a subject, and the triplets are in the form of subject predicate objects. For example, the fields could also reference other resources in the store; for example, the resource could have a reference to another resource as object value for a certain predicate. Object values can also have other types, such as URLs referencing a network or local location. Once the resource is created, the RDF triplets can be used to augment the resource with different types of metadata, such as a document type attribute, a data modified attribute, an author, or the like. By defining these attributes of the resources in the database, the database can be used as an index for specific data object types, such as photos, music, videos, or documents, or even subtypes, such as PDFs, MS Word® document, or the like. Using the database, the inbox view generator 204 can be configured to generate an inbox view with merged local and remote data objects. In another embodiment, however, the inbox view generator 204 can be configured to generate specific types of inbox views, such as a document inbox, a music inbox, a video inbox, or a photo inbox, as illustrated in FIGS. 6A-9C. Using the inbox view generator, the application 310 can use the tracker 308 to get a merged list of local and remote data objects, and the application 310 can decide how the application presents the list, how to refresh the list, or the like.

Figure 4A:
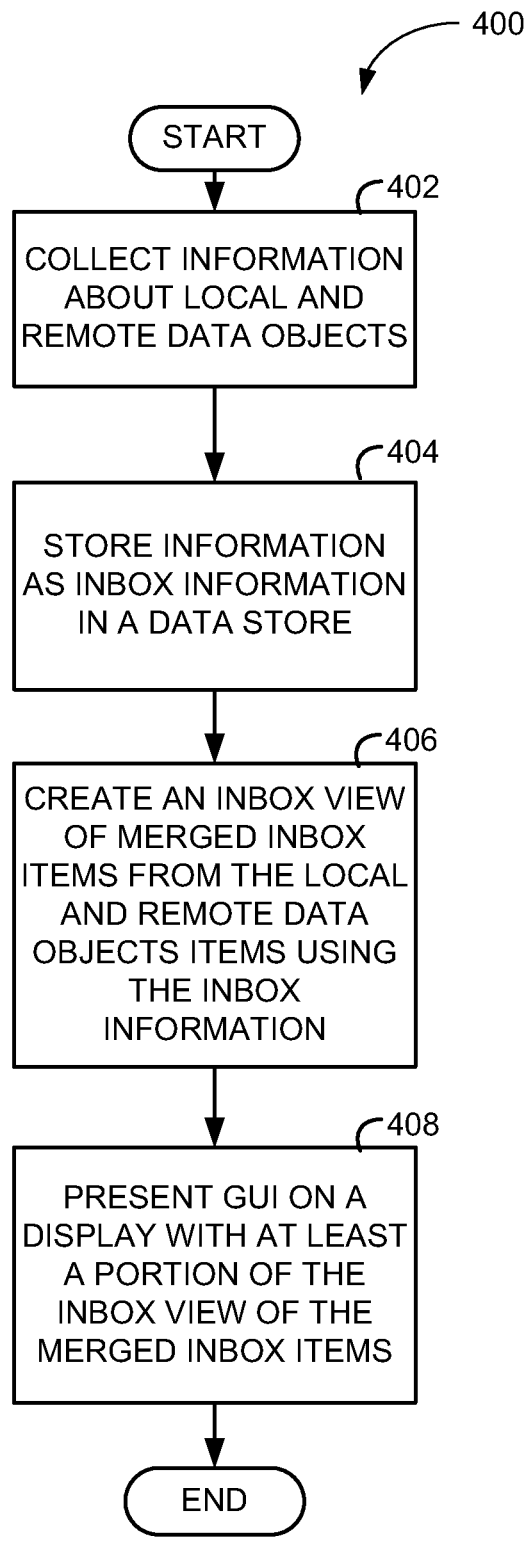
FIG. 4A is a flow diagram of one embodiment of a method of creating and presenting an inbox view of merged local and remote data objects.

FIG. 4A is a flow diagram of one embodiment of a method 400 of creating and presenting an inbox view of merged local and remote data objects. The method 400 is performed by processing logic that may comprise hardware (circuitry, dedicated logic, etc.), software (such as is run on a general purpose computing system or a dedicated machine), firmware (embedded software), or any combination thereof. In one embodiment, the inbox manager 120 of FIG. 1 performs the method 400. In another embodiment, the inbox manager 220 of FIG. 2 performs the method 400. Alternatively, other components of the host computing system 102 can perform some or all of the operations of method 400.

Referring to FIG. 4A, processing logic begins collecting information about data objects (e.g., local data objects 142 and remote data objects 162) (block 402), and stores the information as inbox information in a data store (e.g., data store 150) (block 404). In one embodiment, a first data object is stored locally on a first computing system, a second data object is stored remotely on a second computing system of a first remote data storage service, and a third data object is stored remotely on a third computing system of a second remote data storage service. In another embodiment, the data objects may be stored in other combinations of local and remote data objects as would be appreciated by one of ordinary skill in the art. Using the inbox information stored in the data store, the processing logic creates an inbox view of the merged inbox items from the local and remote data objects (block 406). Next, the processing logic presents a GUI on a display (e.g., 170), displaying at least a portion of the inbox view of the merged inbox items (block 408), and the method 400 ends.

In yet a further embodiment, the processing logic receives account credentials for the remote data storage services and stores the account credentials in a secure data store of the first computing system. In another embodiment, the processing logic receives a user login request, the user login request including single sign-on credentials to access the account credentials stored in the secure data store. The processing logic verifies the user login request, and in response to successful verification, the processing logic access the account credentials stored at the first computing system to access the remote data storage services. In a further embodiment, the processing logic collects the information by 1) retrieving the information from the first remote data storage service using the account credentials for the first remote data storage service; and 2) retrieving the information from the second remote data storage services using the account credentials for the second remote data storage service.

In another embodiment, the processing logic maintains the information about the local and remote data objects in a data store of the first computing system, and detects changes in the information. In one embodiment, the processing logic can present the GUI by generating a link for each of the local and remote data objects to be displayed in the GUI. Each of the links may include a path to a storage location where the respective data object is stored. In another embodiment, the processing logic retrieves the second data object from the first remote data storage service when the link for the second data object is selected by a user, and retrieves the third data object from the second remote data storage service when the link for the third data object is selected by the user. The links may be one of an icon, a thumbnail, a shortcut, an alias, a URL, or a URI, as described herein. In one embodiment, the path is the local path to the storage location of the data object within the computing system. In one embodiment, the path is a local path to the storage location of the data object within a file directory of a file system when the operating system uses the file system. In another embodiment, the path is a network path to the storage location of the data object when the data object is stored remotely from the computing system. In one embodiment, the GUI presents the inbox view in a list view. Alternatively, the GUI presents the inbox view in other types of views, such as a thumbnail view, an icon view, or a menu view. The GUI may be presented in a file browser, a web browser, a viewing area of an application executing on the computing system, or as a main view of the display.

In another embodiment, the processing logic presents the GUI by generating a link for each of the local and remote data objects to be displayed in the GUI. Each of the links refers to one of the data objects stored locally or remotely.

In another embodiment of the method 400, the local data objects are stored in a file directory of a file system and the remote data objects are stored in the remote data storage services, and the processing logic creates the inbox view by organizing the inbox items according to the inbox information regardless of storage locations of the inbox items in the file directory and the remote data storage services. The inbox view may be configured to display the inbox items as being merged into in a single view regardless of where the respective data objects are stored. For example, in one embodiment, the data objects are both local data objects (e.g., 142) and remote data objects (e.g., 152, 162), and the local data objects are stored in a file directory of a file system and at least one data object is stored remotely, such as in a remote data storage or remote server of one of the remote data storage services. The processing logic creates the inbox view by organizing the inbox items according to the inbox information regardless of storage locations of the local data objects even though one or more of the data objects are actually stored remotely.

In another embodiment, the processing logic organizes the inbox items in the inbox view into one or more sub-categories. The one or more sub-categories may include new and recent items, items accessed or created today, favorite items, projects, items shared, or the like The processing logic may present the inbox view that has been organized into the sub-categories in the GUI. The processing logic may receive user input to create, modify, or manage the inbox view. For example, the processing logic may receive user input to customize the inbox view, including which of the one or more sub-categories to display in the GUI and/or the order of the sub-categories. In one embodiment of the method, the inbox information about each of the data objects includes at least one of a creation timestamp, a last-accessed timestamp, a last-modified timestamp, a favorite label, a source label, a calendar event, a reminder event, or a follow-up date. Alternatively, the inbox information may be other information about the data objects, such as a reminder data, due date data, to-do data, to-read data, reoccurring event data, comments from a social networking website where the data object is hosted, or record or history data associated with the respective data objects.

Figure 4B:
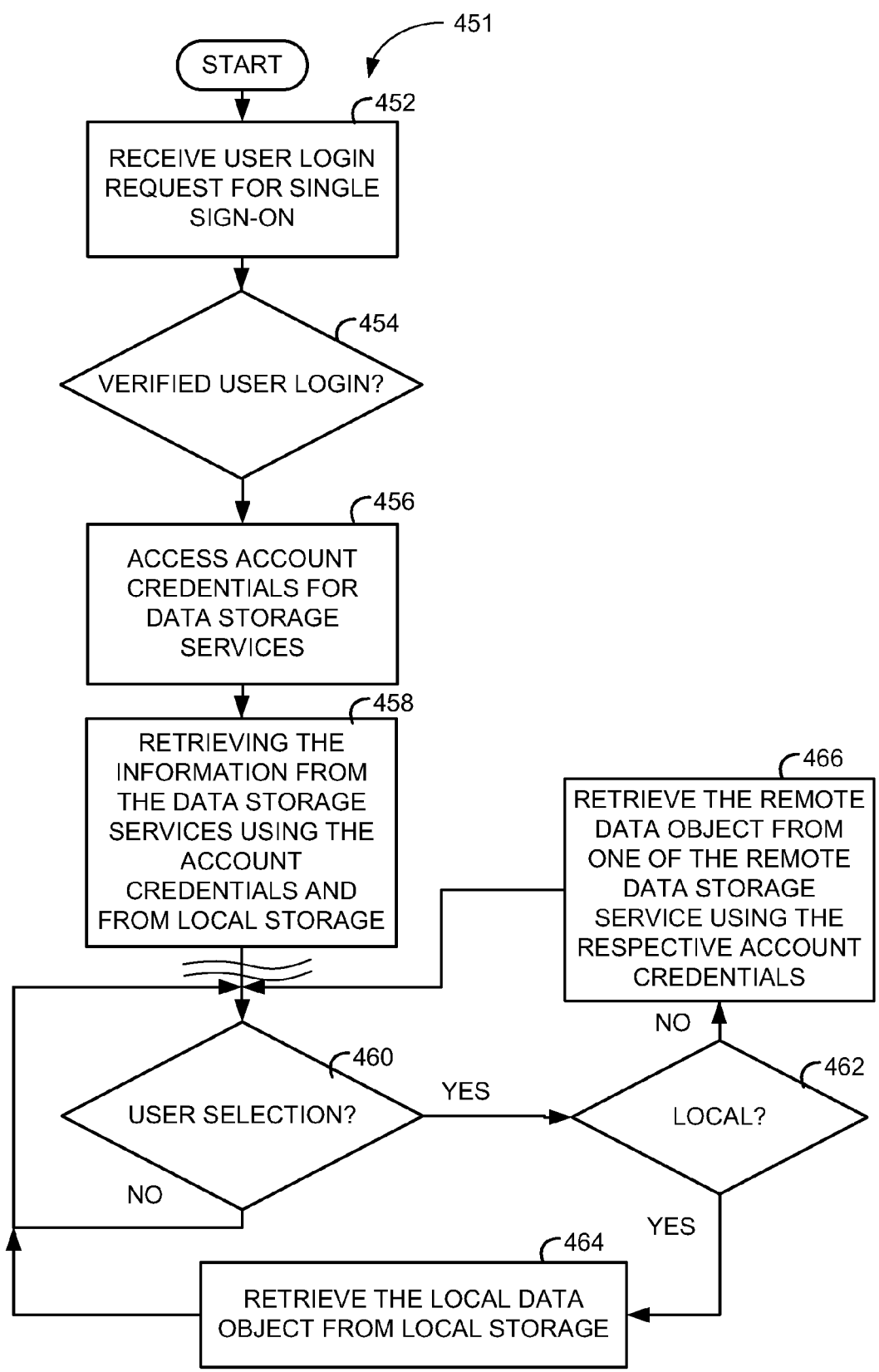
FIG. 4B is a flow diagram of one embodiment of a method of retrieving information and data objects from local storage and from remote data storage services.

FIG. 4B is a flow diagram of one embodiment of a method 450 of retrieving information and data objects from local storage and from remote data storage services. The method 450 is performed by processing logic that may comprise hardware (circuitry, dedicated logic, etc.), software (such as is run on a general purpose computing system or a dedicated machine), firmware (embedded software), or any combination thereof. In one embodiment, the inbox manager 120 of FIG. 1 performs the method 450. In another embodiment, the inbox manager 120 of FIG. 2 performs the method 450. Alternatively, other components of the host computing system 102 can perform some or all of the operations of method 450.

Referring to FIG. 4B, processing logic begins with receiving, at the first computing system, a user login request, the user login request including single sign-on credentials to access the account credentials stored in the secure data store (block 452). The processing logic previously received user input to store the account credentials in the secure data store. Next, processing logic verifies the user login request (block 454). In response to successful verification of the user login request, the processing logic accesses the account credentials stored at the first computing system to access the first and second remote data storage services (block 456). The processing logic may use the access credentials to retrieve information about the remote data objects stored at the remote data storage services (block 458). The processing logic may also access the information from the local data objects stored in local storage. The processing logic may also use the access credentials to access the data objects, such as when opening one of the remote data objects on the first computing system as described below.

In the depicted embodiment, the processing logic determines if one of the data objects is selected in the inbox view (block 460). In response to the user selection, the processing logic determines if the selected data object is a local data object (block 462). If the selected data object is a local data object, the processing logic retrieves the local data object from the local storage (block 464), for example using the local path (absolute or relative path) associated with the link that was selected by the user in the inbox view. The method 450 may return to block 460 to determine if there is another user selection of other data objects. However, if the selected data object is not a local data object, the processing logic retrieves the remote data object from one of the remote data storage services using the respective account credentials (block 466). For example, the processing logic may use a network path (absolute or relative path) associated with the link that was selected by the user in the inbox view. The method 450 may return to block 460 to determine if there is another user selection of other data objects.

In yet another embodiment, the processing logic automatically backs up the data objects by mirroring a local copy and a remote copy of each of the one or more inbox items to be backed up. The local copies are stored in the local data store and the remote copies are stored in the date store. In another embodiment at block 430, the processing logic automatically backs up the data objects by mirroring local copy and a remote copy of each of the one or more of the inbox items for a specified period. After the specified period, the processing logic deletes the local copies of the one or more of the inbox items. Alternatively, the embodiments described herein can be used without automatically backing up the local data objects to the remote data storage services as would be appreciated by one of ordinary skill in the art having the benefit of this disclosure.

Also, as described herein the method may include various operations regarding adding, modifying, or deleting labels corresponding to the data objects, as well as filtering the inbox view according to the labels.

Figure 5:
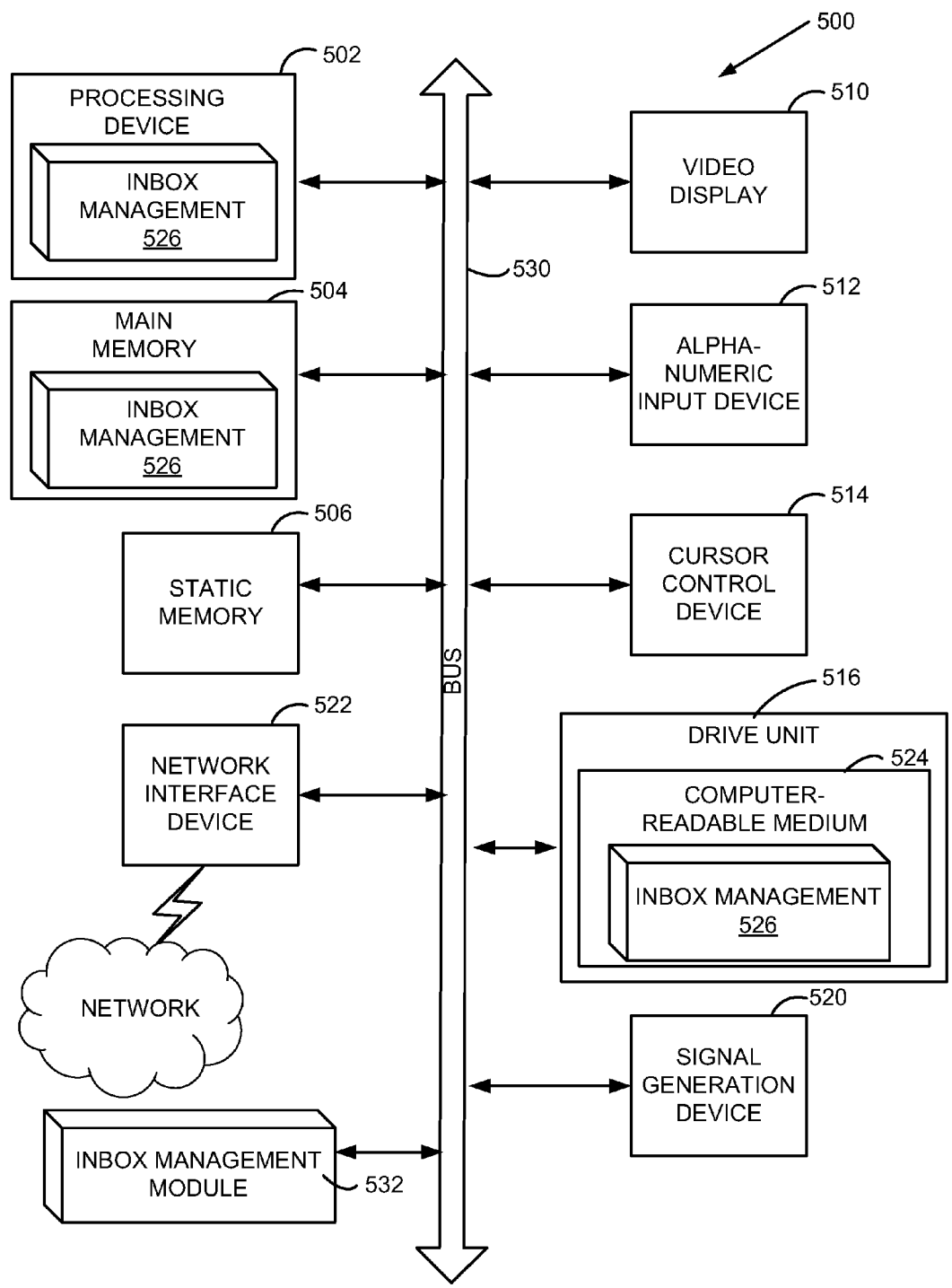
FIG. 5 illustrates a diagrammatic representation of a machine in the exemplary form of a computing system for collecting, aggregating, and displaying type specific content in an inbox like view.

FIG. 5 illustrates a diagrammatic representation of a machine in the exemplary form of a computing system 500 for collecting, aggregating, and displaying type specific content in an inbox like view. Within the computing system 500 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a PC, a tablet PC, a set-top-box (STB), a personal data assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein for collecting, aggregating, and displaying type specific content in an inbox like view, such as the method 400 and 450 described above. In one embodiment, the computing system 500 represents various components that may be implemented in the host computing system 102 as described above. Alternatively, the host computing system 102 may include more or less components as illustrated in the computing system 500.

The exemplary computing system 500 includes a processing device 502, a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a data storage device 516, each of which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic (e.g., inbox information management 526) for performing the operations and steps discussed herein.

The computing system 500 may further include a network interface device 522. The computing system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable storage medium 524 on which is stored one or more sets of instructions (e.g., inbox information management 526) embodying any one or more of the methodologies or functions described herein. The inbox information management 526 may also reside, completely or at least partially, within the main memory 504 and/or within the processing device 502 during execution thereof by the computing system 500, the main memory 504, and the processing device 502 constituting computer-readable storage media. The inbox information management 526 may further be transmitted or received over a network via the network interface device 522.

While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The inbox information management module 532, components, and other features described herein (for example in relation to FIGS. 1-3) can be implemented as discrete hardware components or integrated in the functionality of hardware components such as ASICS, FPGAs, DSPs, or similar devices. The inbox information management module 532 may implement operations of inbox information management as described herein with respect to FIGS. 4A-4B. In addition, the inbox information management module 532 can be implemented as firmware or functional circuitry within hardware devices. Further, the inbox information management module 532 can be implemented in any combination hardware devices and software components.

FIGS. 6A-6H illustrate an exemplary GUI 600, including a document inbox view 602, according to one embodiment. The document inbox view 602 includes a working area with various links to documents that are stored locally and remotely. The document inbox view 602, which includes multiple inbox items, is generated by the inbox view generator 204. This inbox view 602 may display all of the inbox items, or only a portion of the inbox view, but additional inbox items may be lower in the inbox view 602. These additional inbox items can be accessed, for example, by the user scrolling down in the inbox view 602. The inbox items are represented as thumbnails, but could also be other types of links as described herein. The inbox view 602 is a grid view of thumbnails, but could be a list view, a menu view, an icon view, or any combination thereof.

Figure 6A:
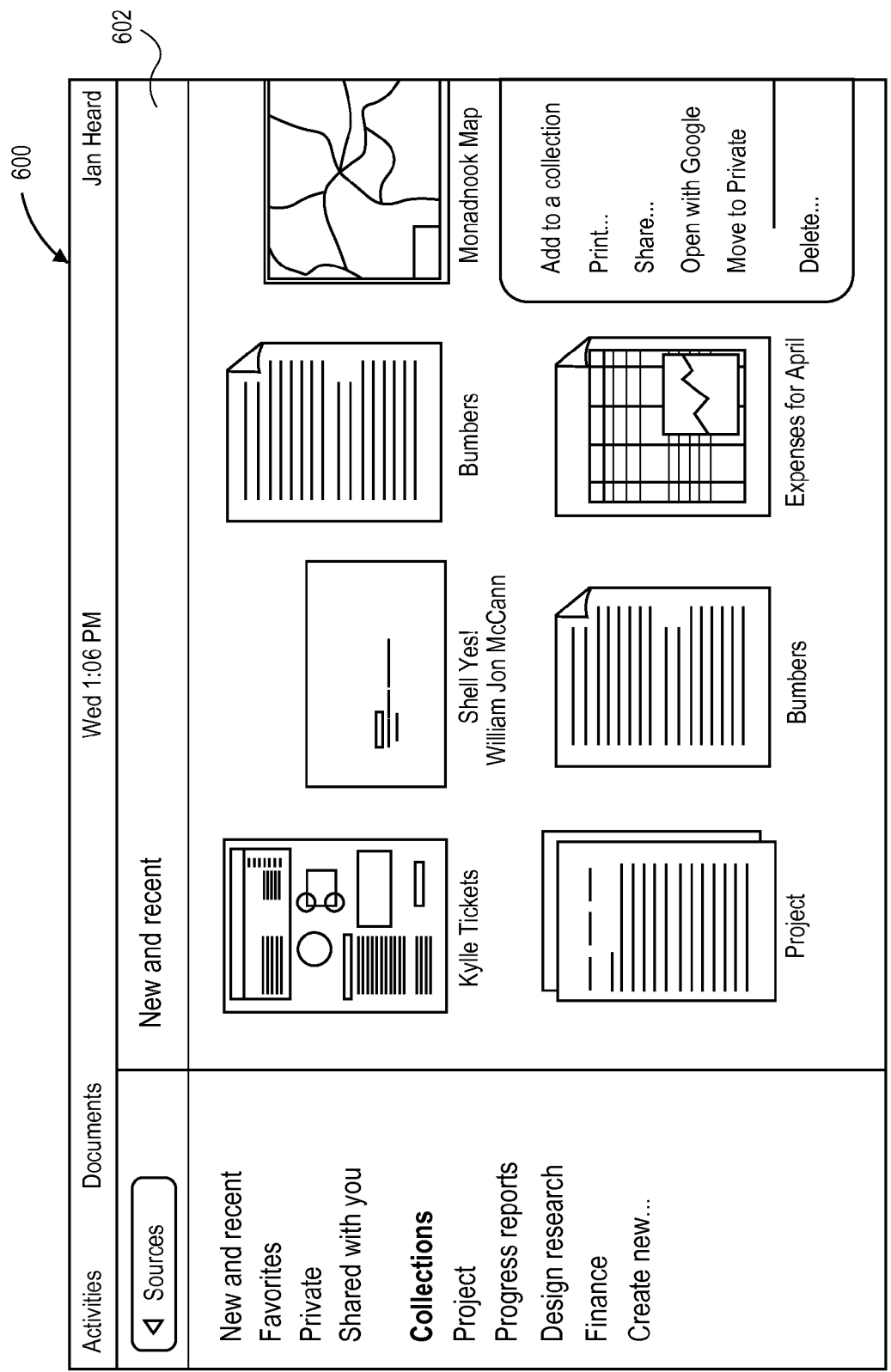

As shown in FIG. 6A, the user may select various options from a menu that is displayed in response to the user right-clicking the inbox item. These options may include printing, sharing, opening in the remote storage service, moving to private, or deleting the inbox item. These options may also include an option to open the inbox item (e.g., opening an application or a document), a selection option to select an application to use when opening the inbox item, an option to quick view the inbox item, an option to eject the inbox item, an option to add a label to the inbox item, an option to share the inbox item, an option to move the inbox item, and an option to move the inbox item to the trash. Alternatively, other types of options can be provided, and more or less options can be provided than as shown in FIG. 6A as would be appreciated by one of ordinary skill in the art having the benefit of this disclosure.

Figure 6B:
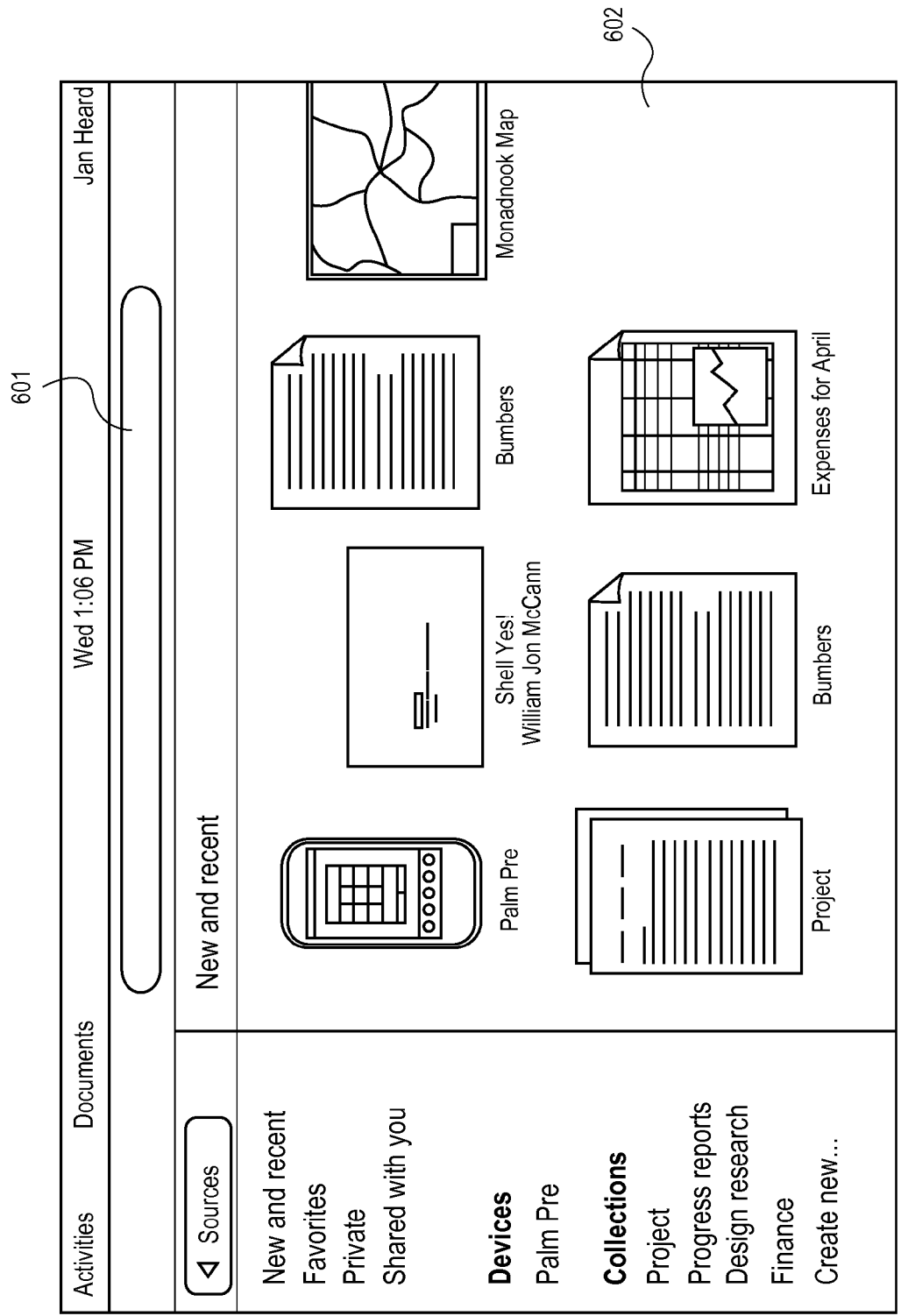

The GUI 600 may include a sidebar that indicates categories, such as new and recent, favorites, private, shared, as well as other types of collections, such as the depicted examples of progress reports, design research, finance, or the like. The sidebar can also allow new collections to be created. The sidebar can also show devices, such as illustrated in FIG. 6B. The document inbox view 602 includes thumbnails for various documents. These documents may be local documents or may be remote documents as described herein. The GUI 600 may also allow a document to be printed, shared, opened with another application or service (such as Google Docs), and moved to another category. This may be done using a menu, such as by right-clicking on one of the documents in the view as illustrated in FIG. 6A.

As illustrated in FIG. 6B, the GUI 600 may include a search bar 601. The search bar 601 may be activated in various ways, such as by dragging down the tool bar, a keyboard key, or the like. The sidebar could be configured to act like a filter when in search mode. Alternatively, the GUI 600 can provide a menu that provides one or more filters, such as for filtering the source, the document types, and the type of search (e.g., matching all, title, author, content). The GUI 600 may also include a selection button that activates a selection mode that allows the user to select one or more documents in the document inbox view 602.

Figure 6D:
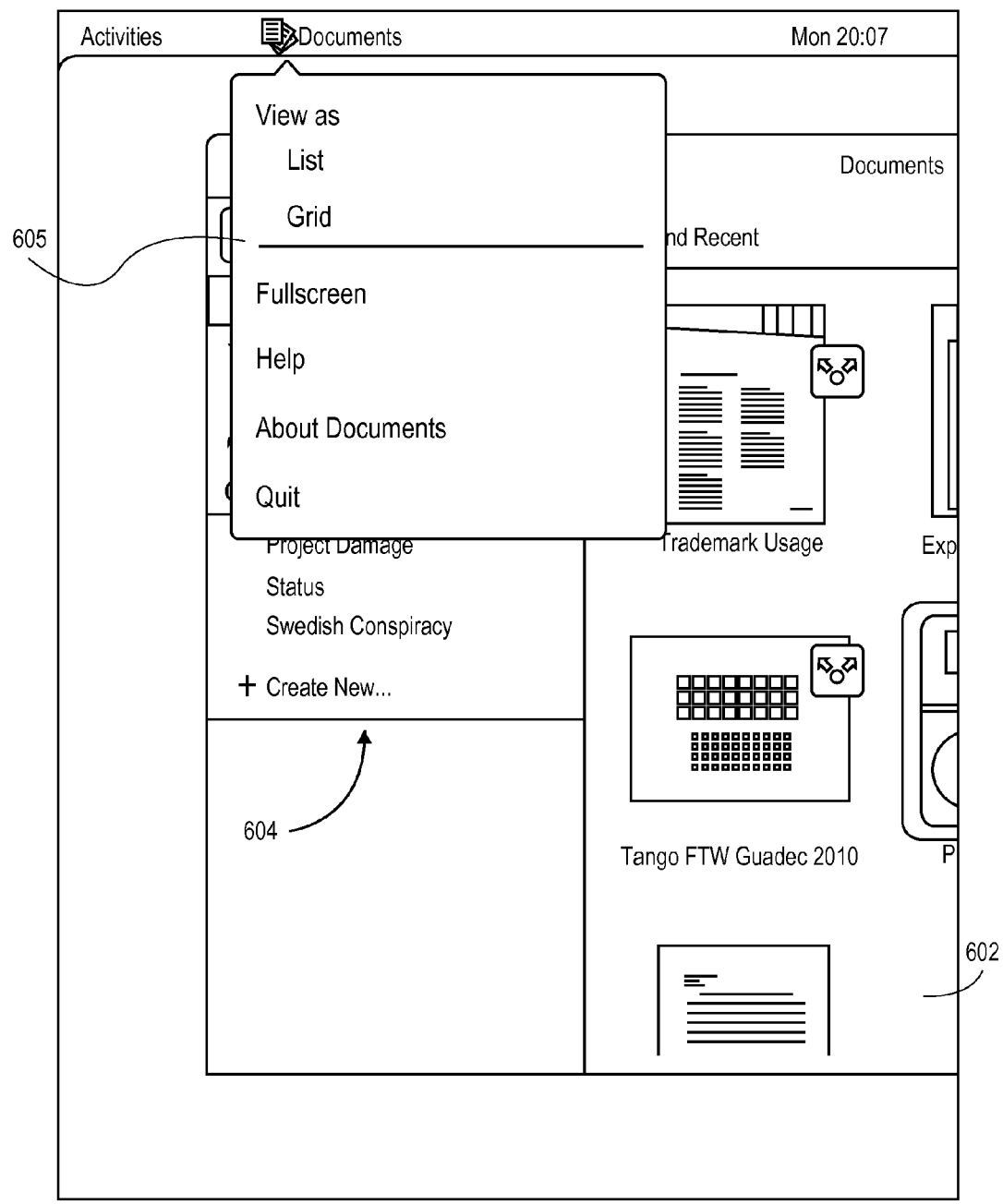

As illustrated in FIG. 6C, when the sources button is selected, the sidebar may slide out of view and the sources may be shown in the sidebar. The GUI 600 can also be switched into a grid view, or a list view, instead of the thumbnail view, as illustrated in FIG. 6D with a menu 605. The menu 605 may appear when the user selects the documents menu above, or may be activated in other ways, such as by right-clicking on the view 602. FIG. 6D also illustrates a button 604 to create a new project. In one embodiment, depending on the available horizontal screen area, a sidebar may retract into a toolbar button and be accessible from there. The benefit of the exposed sidebar may be that it is ready to be used as a drop target for drag and drop (DND) actions. The menu/toolbar state may be toggled using a keyboard key, such as F9.

Figure 6E:
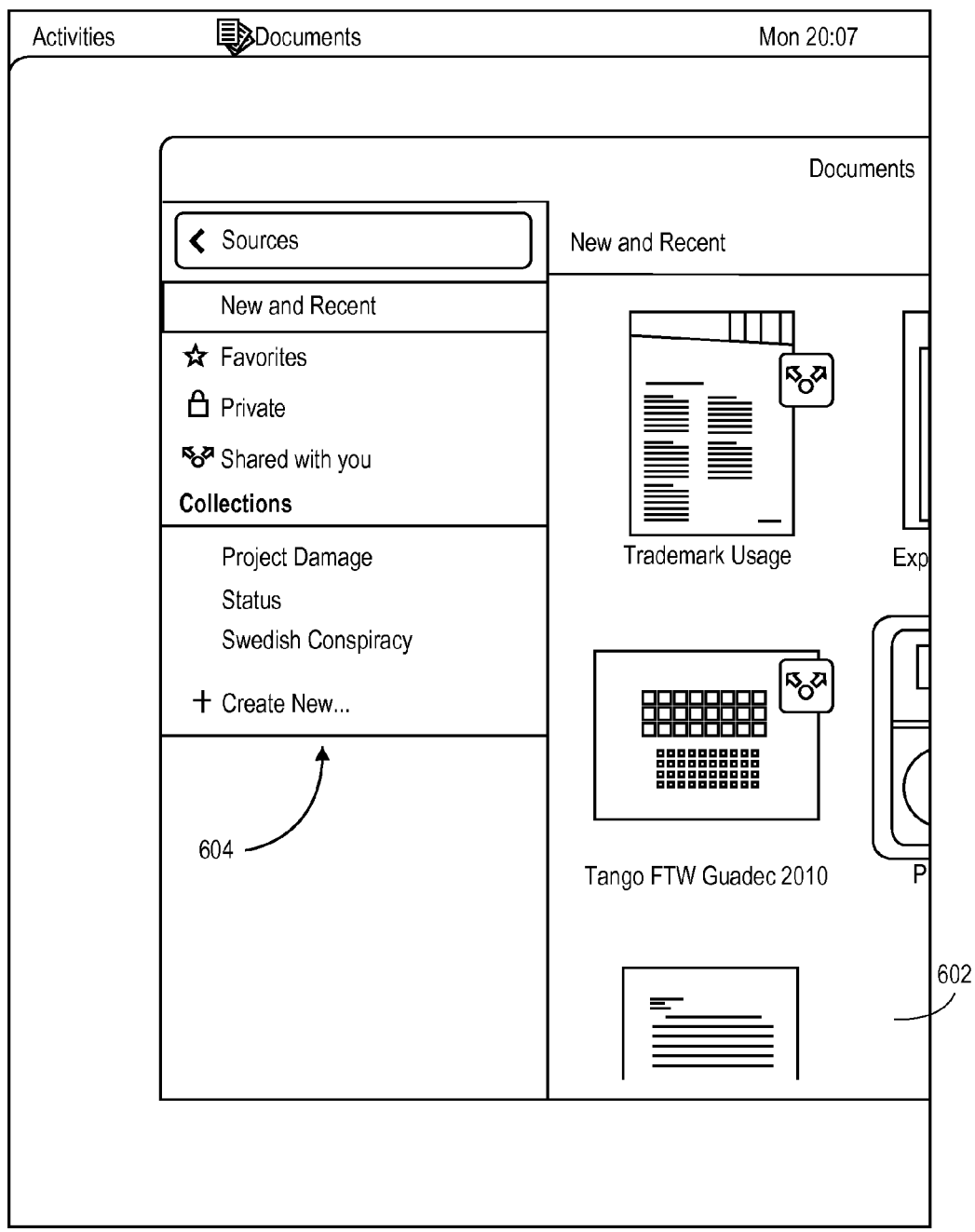
Figure 6F:
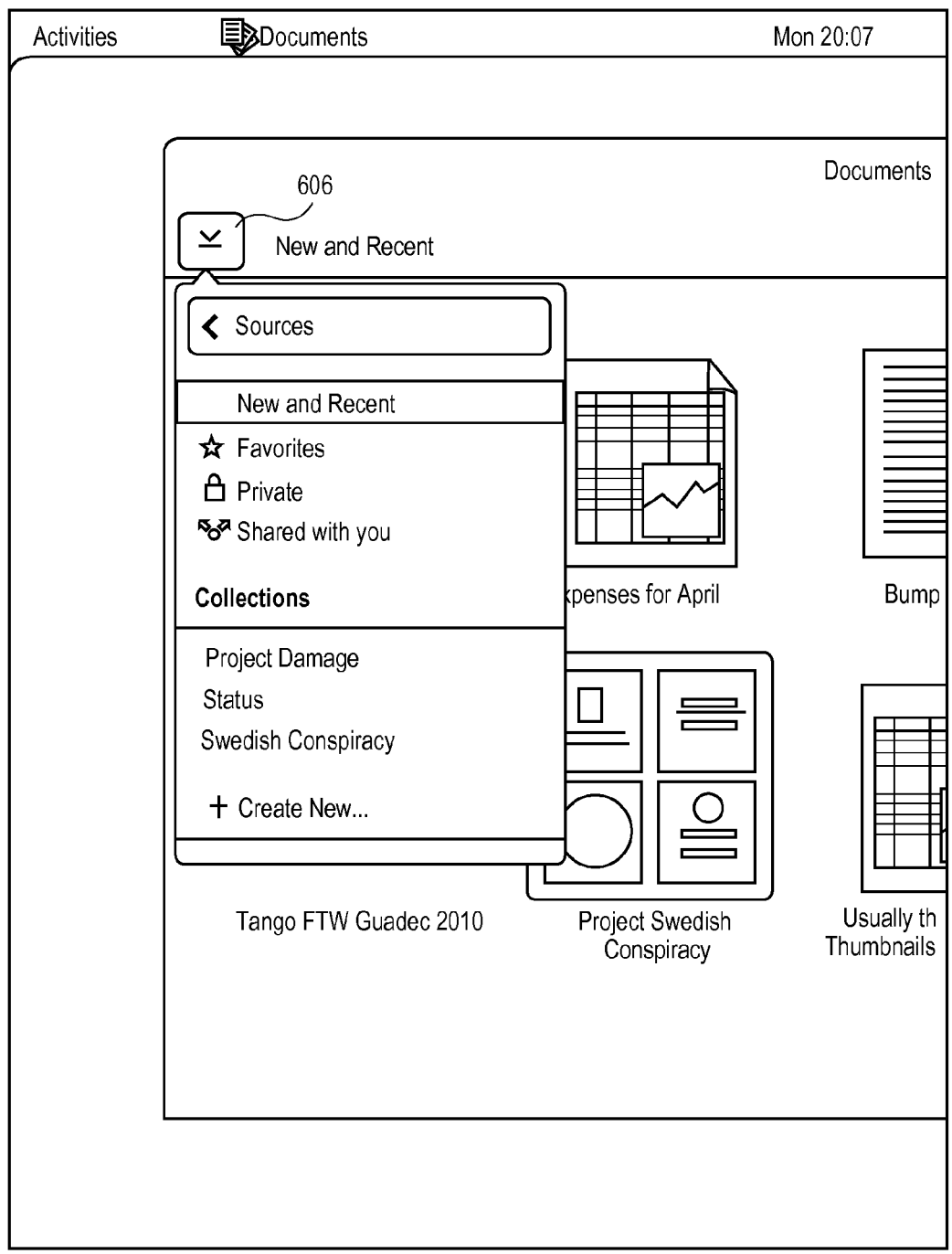
Figure 6G:
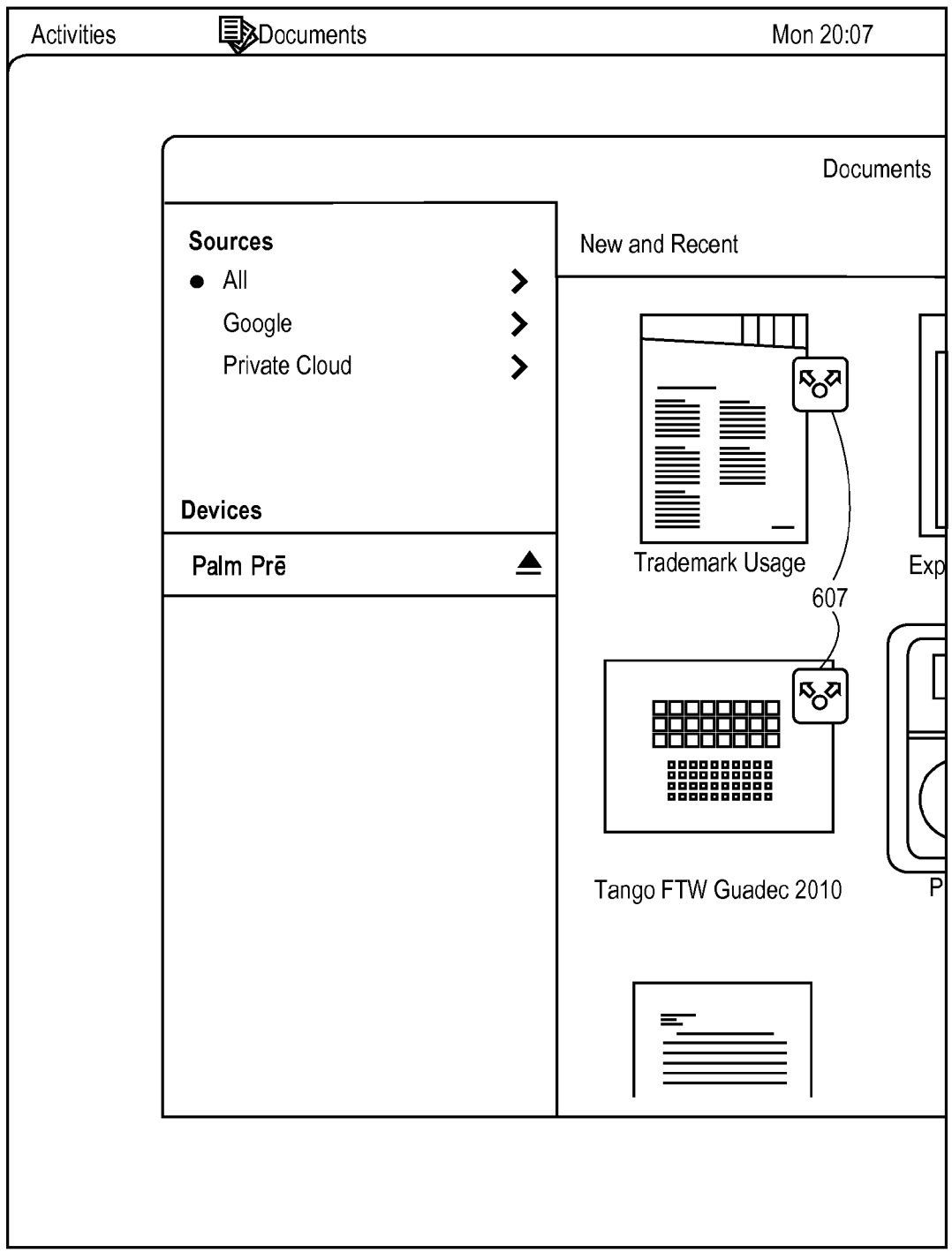
Figure 6H:
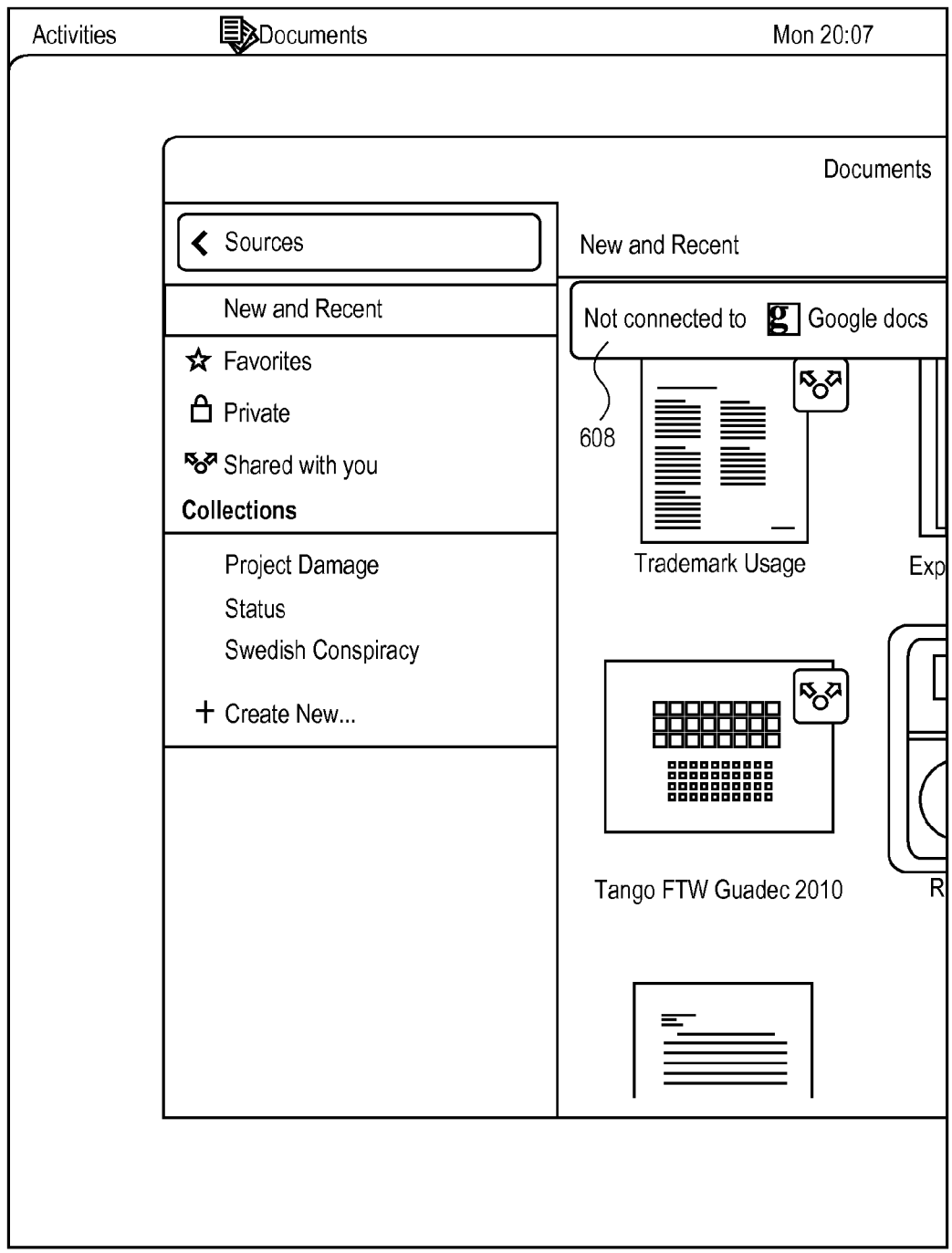

FIGS. 6E and 6F illustrate when a particular data source is selected in the sidebar by clicking on the "Sources" button. This may slide the content of the sidebar within the sidebar boundary. FIG. 6G shows shared indicators 607 to indicate documents that have been shared with the user. The GUI 600 can also be used to provide notifications to the user, such as illustrated in FIG. 6H. For example, application domain notifications can be shown within the document inbox view 602. In particular, FIG. 6H shows a notification 608 to indicate that the application (document viewer) is not connected to the Google Docs service. These notifications within the document inbox view 602 may be used instead of system notifications. However, in other embodiments, system notifications could still be used, or a combination of notification types may be used. Also, in other embodiments, the source button and sidebar may be absent from the design as would be appreciated by one of ordinary skill in the art having the benefit of this disclosure.

In another embodiment, the GUI 600 may use a search mode that can be activated by various mechanisms. For example, full screen-enabled applications can use the same pattern for searching, such as by hiding the search bar in a sunk toolbar that appears as the user uses one of the shortcuts (e.g., Ctrl+F or Ctrl+S shortcuts), starts typing without an explicit widget being focused, or drags the regular toolbar, for examples. When dragging, the toolbar may reveal the input box sliding down rather than stretching, and may allow to go a few pixels pas the fully exposed toolbar, retracting The GUI 600 of FIGS. 6A-6H provides a simple and elegant replacement for using files and folders to show the document directory. The GUI 600 can be configured to show recent local and online/cloud documents (remote documents) and can allow the documents to be searched. The GUI 600 can also be configured to store a reading list or a to-do list, as well as provide reminders. The GUI 600 can also be configured to show documents shared by contacts (e.g., friends, colleagues, or the like). The GUI 600 can also show a preview or can facilitate the opening the document, such as full-screen. The GUI 600 allows the documents to be shared, such as via email, IM, social networking portals, or the like. The GUI 600 can also be configured to allow documents to be uploaded, printed, downloaded, or the like. The GUI 600 can also allow a user to select one or more of the documents as favorites, or assign one or more labels or tags. Of course, the GUI 600 can allow the document to be opened in a full-featured editor for non-trivial changes.

FIGS. 7A-7D illustrate an exemplary GUI 700, including a photo inbox view 702, according to one embodiment. The photo inbox view 702 includes a working area with various links to photos that are stored locally and remotely. The photo inbox view 702, which includes multiple inbox items, is generated by the inbox view generator 204. This photo inbox view 702 may display all of the inbox items, or only a portion of the inbox view, but additional inbox items may be lower in the photo inbox view 702. These additional inbox items can be accessed, for example, by the user scrolling down in the photo inbox view 702. The photo inbox items are represented as thumbnails, but could also be other types of links as described herein. The photo inbox view 702 is a grid view of thumbnails, but could be a list view, a menu view, an icon view, or any combination thereof.

As shown in FIG. 7A, the user may select various options from a menu 705 that is displayed in response to the user right-clicking the inbox item. These options may include sharing, opening in a photo editor application, moving to an album, moving to private, or deleting. These options may also include an option to open the inbox item using the remote storage service, a selection option to select an application to use when opening the inbox item, an option to quick view the inbox item, an option to eject the inbox item, an option to add a label to the inbox item, an option to share the inbox item, an option to move the inbox item, and an option to move the inbox item to the trash. Alternatively, other types of options can be provided, and more or less options can be provided than as shown in FIG. 7A as would be appreciated by one of ordinary skill in the art having the benefit of this disclosure.

Figure 7B:
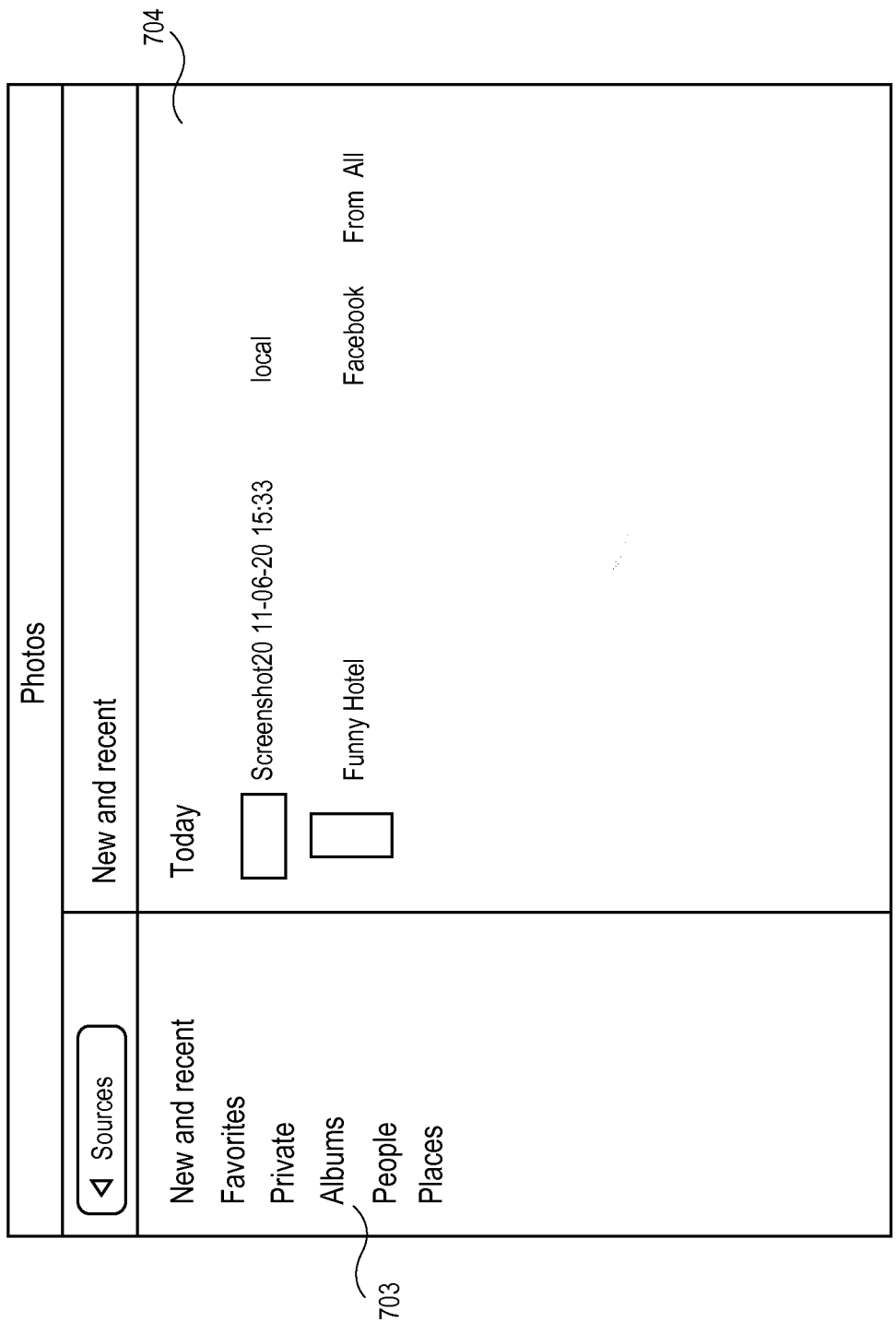

As shown in FIG. 7B, the GUI 700 may include a sidebar 703 that indicates categories, such as new and recent, favorites, private, albums, people, place, shared. The sidebar can also include a source button that when selected shows the sources of the documents, such as in the sidebar. The photo inbox view 702 includes thumbnails for various photos. These photos may be local photos stored locally or may be remote photo stored remotely as described herein. The GUI 700 may also allow a document to be printed, shared, opened with another application or service (such as Google Docs), and moved to another category. This may be done using a menu, such as by right-clicking on one of the documents in the view as illustrated in FIG. 6A.

Figure 7C:
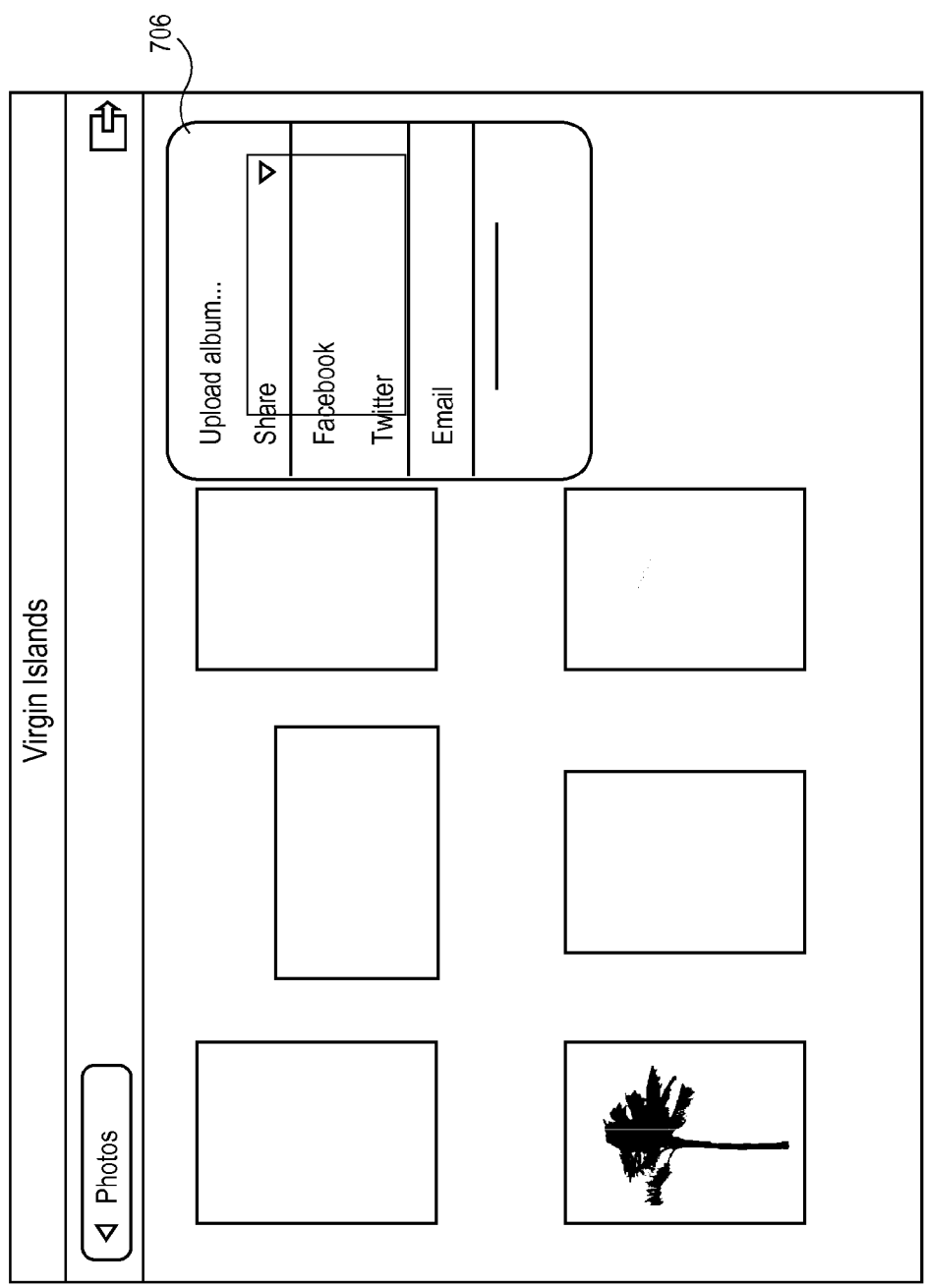

FIG. 7C illustrates another menu 706 to allow a user to upload an album, (only if the default location isn't already in the cloud at one of the remote data storage services), share, upload to Facebook, upload to Twitter, send by email, or delete. Of course, the menu 706 can provide other others. Also, it should be noted that the photo inbox view 702 may display individual photos, or collections of photos, such as albums.

Figure 7D:
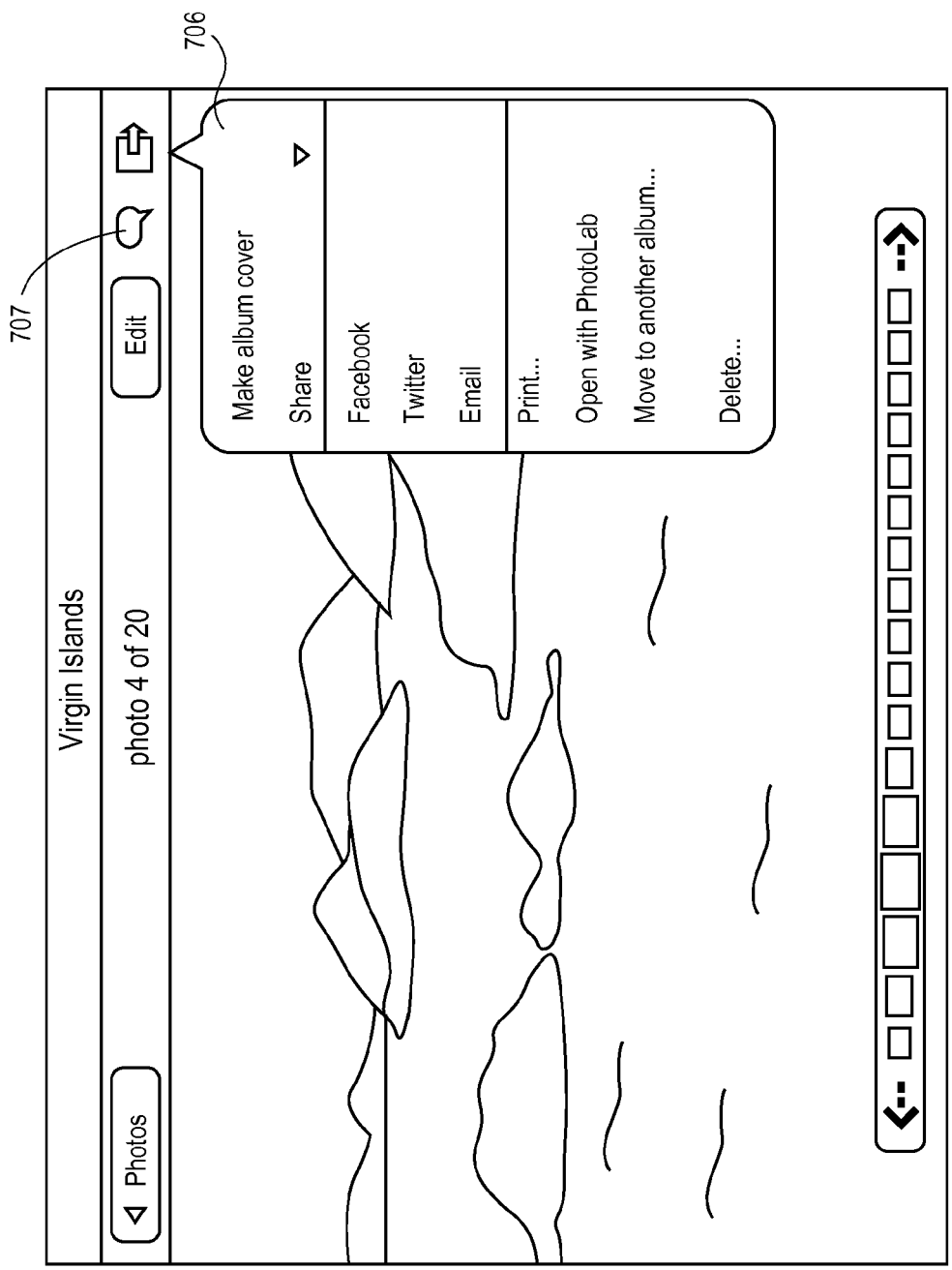

FIG. 7D illustrates when an individual photo has been selected for viewing. In this embodiment, comments can be shown by activating a comments button 707. Similarly, the menu 706 can be used to make the photo the album cover, share, upload to Facebook, upload to Twitter, send by email, print, open with a photo editor application, move to another album, or delete. The menu 706 of FIG. 7D may include more or less options than those illustrated.

The GUI 700 of FIGS. 7A-7D provides a simple and elegant replacement for using files and folders to show the pictures directory. The GUI 700 can be configured to show recent local and online/cloud photos (remote photos) and can allow the photos to be searched. The GUI 700 can also be configured to view photos on attached devices, view new photos shared with friends, view full-screen slide shows, or the like. The GUI 700 can also be configured to show photos shared by contacts (e.g., friends, colleagues, or the like). The GUI 700 can also show a preview or can facilitate the opening the photo, such as full-screen. The GUI 700 allows the photos to be shared, such as via email, IM, social networking portals, or the like. The GUI 700 can also be configured to allow photos to be uploaded, printed, downloaded, or the like. The GUI 700 can also allow a user to select one or more of the photos as favorites, or assign one or more labels or tags. The GUI 700 can also allow for basic manipulation of the photos, such as rotate, crop, enhance, remove/delete, combine into an album, or the like. Of course, the GUI 700 can allow the photo to be opened in a full-featured photo editor for non-trivial changes.

Figure 8:
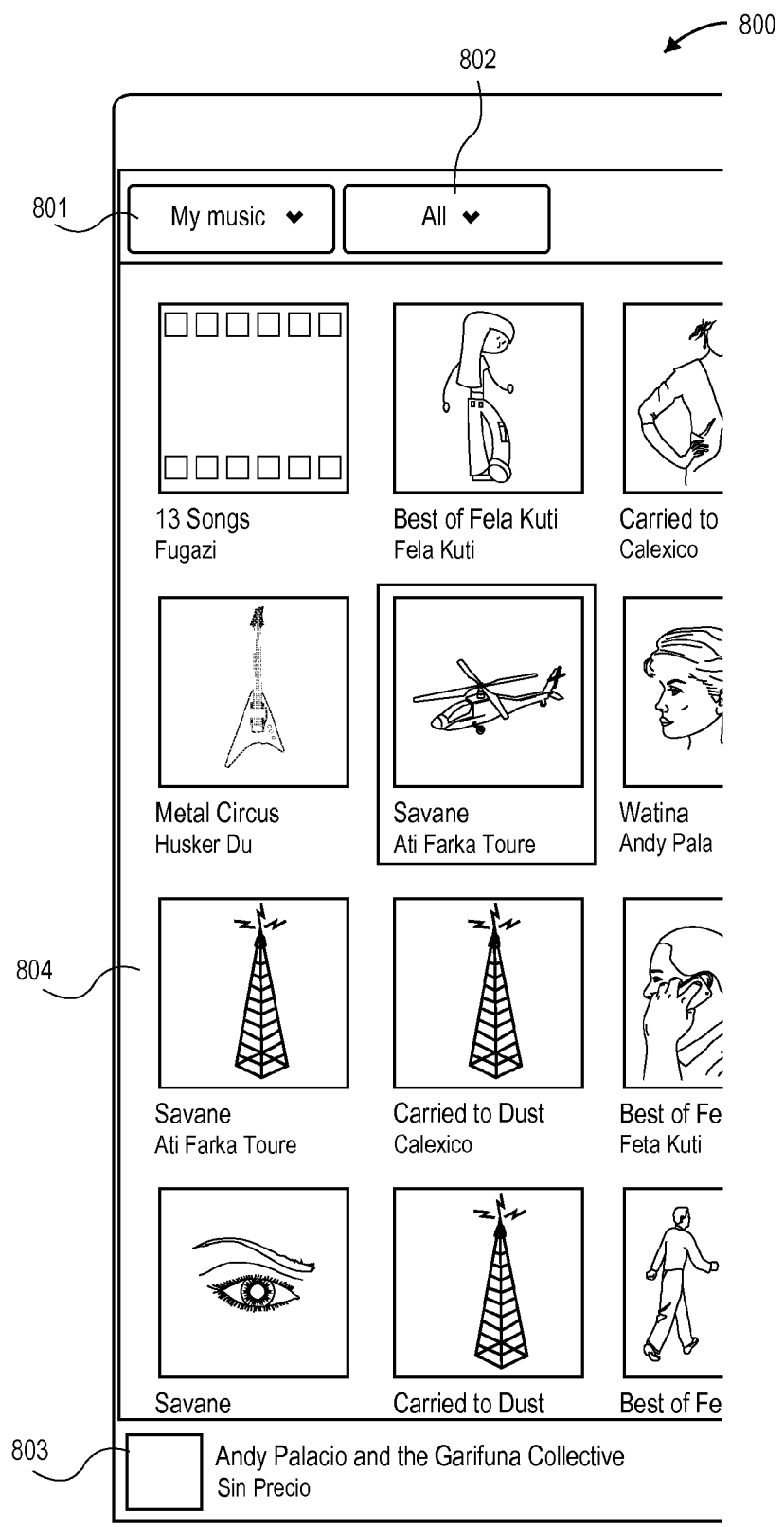
FIG. 8 illustrates an exemplary GUI, including a music inbox view, according to one embodiment.

FIG. 8 illustrates an exemplary GUI 800, including a music inbox view 802, according to one embodiment. The music inbox view 802 includes a working area with various links to music that are stored locally and remotely. The music inbox view 802, which includes multiple inbox items, is generated by the inbox view generator 204. This inbox view 802 may display all of the inbox items, or only a portion of the inbox view, but additional inbox items may be lower in the inbox view 802. These additional inbox items can be accessed, for example, by the user scrolling down in the inbox view 802. The inbox items are represented as thumbnails of the album cover art, but could also be other types of links as described herein. The inbox view 802 is a grid view of thumbnails, but could be a list view, a menu view, an icon view, or any combination thereof. The GUI 800 may include a widget 801 to "My Music" which allows a user to change the music source, including optical media, remote media, or other types of attached media devices. The GUI 800 may also include a filter widget 802 that allow the music items to be filtered, such as by genre, recent, old, favorites, or the like. The GUI 800 may also display the currently playing track 803.

Figure 9A:
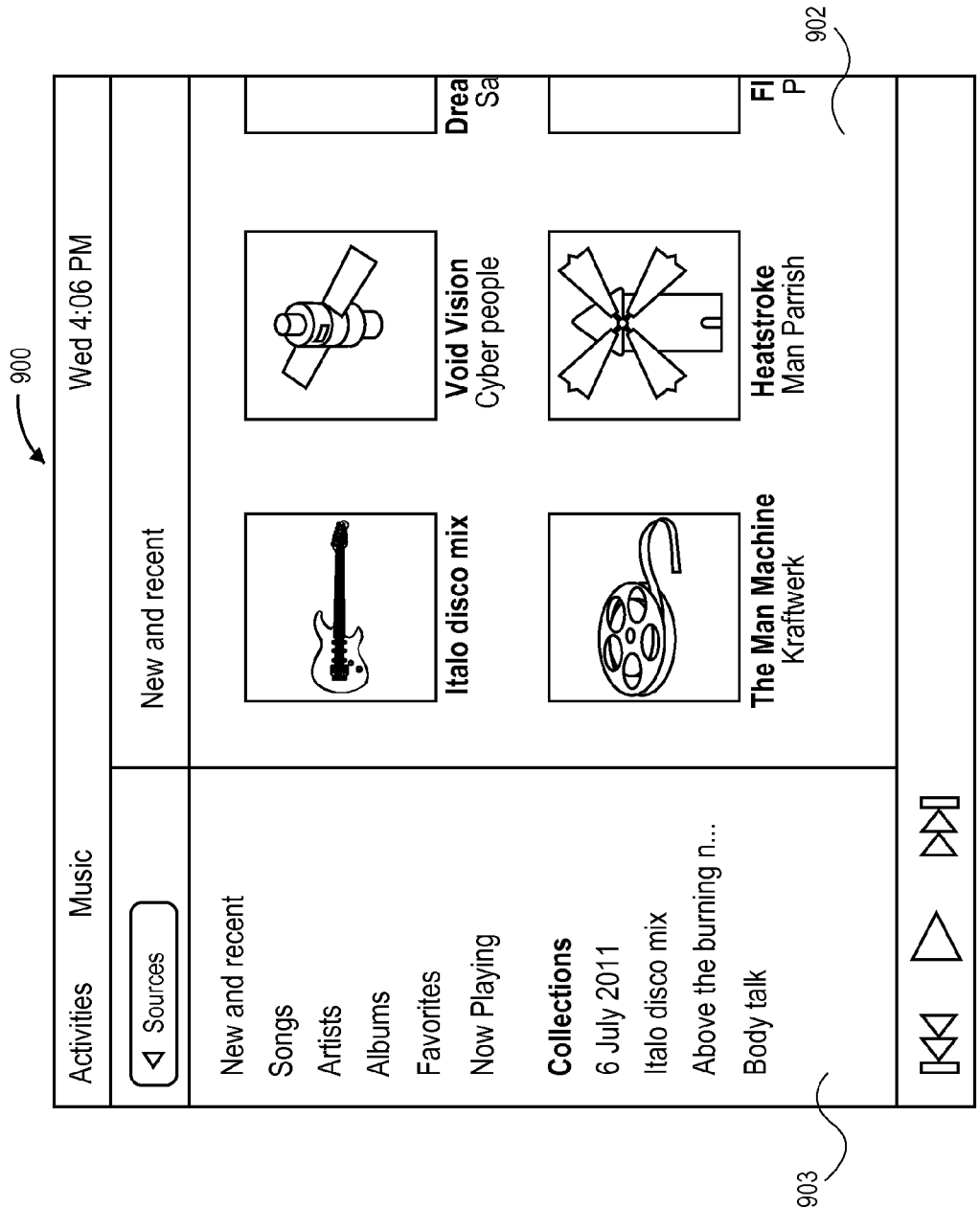
FIGS. 9A-9C illustrate an exemplary GUI, including a music inbox view, according to another embodiment.
Figure 9B:
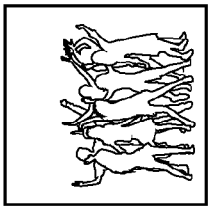
Figure 9C:
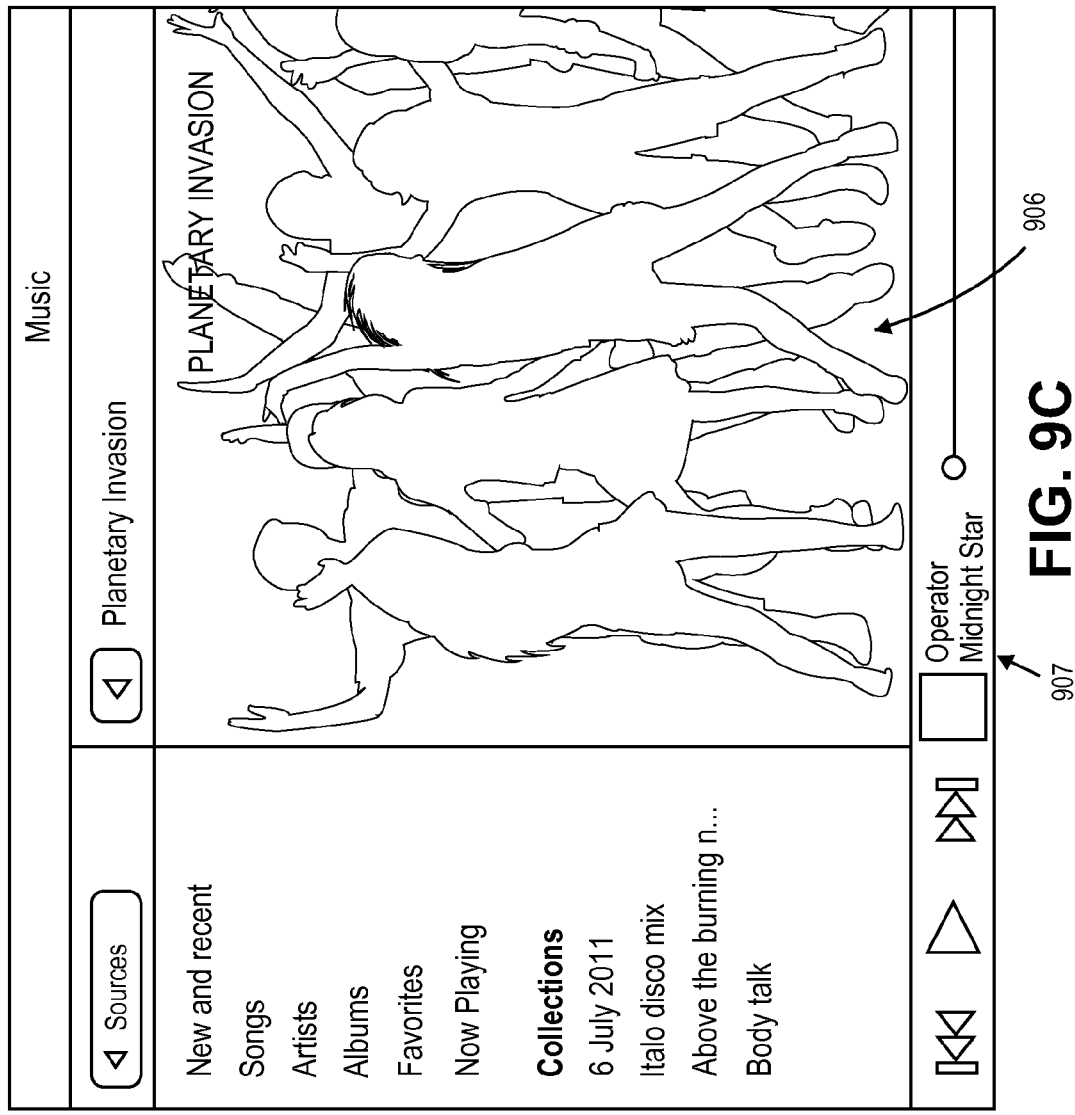

FIGS. 9A-9C illustrate an exemplary GUI 900, including a music inbox view 902, according to another embodiment. The music inbox view 902 includes a working area with various links to music that are stored locally and remotely. The music inbox view 902, which includes multiple inbox items, is generated by the inbox view generator 204. This inbox view 902 may display all of the inbox items, or only a portion of the inbox view, but additional inbox items may be lower in the inbox view 902. These additional inbox items can be accessed, for example, by the user scrolling down in the inbox view 902. The inbox items are represented as thumbnails of the album cover art, but could also be other types of links as described herein. The inbox view 902 is a grid view of thumbnails, but could be a list view, a menu view, an icon view, or any combination thereof. Unlike the GUI 800, the GUI 900 includes a sidebar 903 that indicates categories, such as new and recent, favorites, private, shared, songs, artists, albums, and now playing. The sidebar 903 may also include collections, such as playlists. The sidebar can also allow new categories or collections to be created. The sidebar can also show attached devices. The music inbox view 902 includes thumbnails of album art for collections or individual tracks. These tracks or collections may be local documents or may be remote documents as described herein. The GUI 900 may also allow music to be added to an existing playlist, to create a new playlist, to designate the music to be played, or to switch to another song. This may be done via the menu 905, as illustrated in FIG. 9B, such as by right-clicking on one of the music items in the view as illustrated in FIGS. 6A and 6B. The GUI 900 may include widgets to play, rewind, fast forward, pause, or the like. Also, as illustrated in FIG. 9C, the GUI 900 may display the album art of a currently playing song 907, and can be configured to show a video 906 if available. It should also be noted that FIGS. 8 and 9A-9C show music media files, but the GUIs 800 and 900 could be configured to accommodate other media types, like videos, slide shows, photos, or any combination thereof.

The GUIs 800 and 900 of FIGS. 8 and 9A-9C provide simple and elegant replacements for using files and folders to show the music directory. The GUIs 800 and 900 can be configured to show recent local and online/cloud music (remote music) and can allow the music to be searched. The GUIs 800 and 900 can also be configured to allow a user to listen to the local and the online/cloud collections of music. The GUIs 800 and 900 can also be configured to allow the user to listen to music on attached devices, or music shared by friends. The GUIs 800 and 900 can be configured to allow the music to be shared, such as via email, IM, social networking portals, or the like. The GUIs 800 and 900 can also be configured to allow music to be uploaded, downloaded, or the like. The GUIs 800 and 900 can also allow a user to select one or more of the music as favorites, or assign one or more labels or tags. Of course, the GUIs 800 and 900 can allow the music to be opened in a full-featured music player or editor.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to utilize the invention and various embodiments with various modifications as may be suited to the particular use contemplated.

What is claimed is:

1. A method comprising:

collecting, by a processing device, information about a plurality of data objects associated with activities of a user, wherein a first data object of the plurality of data objects is stored locally on a first computing system, a second data object of the plurality of data objects is stored remotely on a second computing system of a first remote data storage service, and a third data object of the plurality of data objects is stored remotely on a third computing system of a second remote data storage service;

receiving account credentials associated with the user for the first and second remote data storage services;

storing the account credentials in a secure data store of the first computing system;

assigning one or more labels to the plurality of data objects in view of the information associated with the user, wherein the one or more labels comprise a new label;

generating a data display of a plurality of data items, wherein generating the data display comprises:

merging the plurality of data items from the first and second remote data storage services into a single view for the user;

organizing the plurality of data items in view of the one or more labels assigned to the plurality of data objects associated with the user; and presenting the data display to a graphical user interface (GUI) of the first computing system, wherein said presenting the data display comprises generating a link for each of the plurality of data objects to be displayed in the GUI, and wherein each of the links comprise a path to a storage location where the respective data object is stored, and wherein each of the links comprise a mapping of an identifier of the respective data object and a Uniform Resource Identifier (URI) of the respective data object's location.

2. The method of claim 1, further comprising:
receiving, at the first computing system, a user login request, wherein the user login request comprises single sign-on credentials to access the account credentials stored in the secure data store;
verifying the user login request; and
in response to successful verification of the user login request, accessing the account credentials stored at the first computing system to access the first and second remote data storage services.

3. The method of claim 2, wherein said collecting information comprises:
retrieving the information from the first remote data storage service using the account credentials for the first remote data storage service; and
retrieving the information from the second remote data storage services using the account credentials for the second remote data storage service.

4. The method of claim 1, further comprising:
maintaining the information about the plurality of data objects in a data store of the first computing system.

5. The method of claim 1, wherein said presenting the GUI comprises:
retrieving the second data object from the first remote data storage service when the link for the second data object is selected by the user; and
retrieving the third data object from the second remote data storage service when the link for the third data object is selected by the user.

6. The method of claim 1, wherein said presenting comprising filtering the data display in view of the one or more labels and presenting the filtered data display in at least one of a list view, a thumbnail view, an icon view, or a menu view.

7. The method of claim 1, wherein said presenting comprising presenting the GUI in at least one of a file browser, a web browser, a viewing area of an application executing on the first computing system, or a main view of the display.

8. The method of claim 1, wherein said presenting the GUI comprises generating a link for each of the plurality of data objects to be displayed in the GUI, and wherein each of the links refers to one of the plurality of data objects stored in the first computing system or stored remotely from the first computing system.

9. A non-transitory computer readable storage medium comprising instructions that, when executed by a processing device, cause the processing device to:
collect, by the processing device, information about a plurality of data objects associated with activities of a user, wherein a first data object of the plurality of data objects is stored locally on a first computing system, a second data object of the plurality of data objects is stored remotely on a second computing system of a first remote data storage service, and a third data object of the plurality of data objects is stored remotely on a third computing system of a second remote data storage service;
receive account credentials associated with the user for the first and second remote data storage services;
store the account credentials in a secure data store of the first computing system;
assign one or more labels to the plurality of data objects in view of the information associated with the user, wherein the one or more labels comprise a new label;
generate a data display of a plurality of data items, wherein to generate the data display, the processing device to:
merge the plurality of data items from the first and second remote data storage services into a single view for the user;
organize the plurality of data items in view of the one or more labels assigned to the plurality of data objects associated with the user; and
present the data display to a graphical user interface (GUI) of the first computing system, wherein said presentation of the data display via the GUI comprises to generate a link for each of the plurality of data objects to be displayed in the GUI, and wherein each of the links comprise a path to a storage location where the respective data object is stored, and wherein each of the links comprise a mapping of an identifier of the respective data object and a Uniform Resource Identifier (URI) of the respective data object's location.

10. The non-transitory computer readable storage medium of claim 9, wherein the processing device is further to:
receive, at the first computing system, a user login request, wherein the user login request comprises single sign-on credentials to access the account credentials stored in the secure data store;
verify the user login request; and
in response to successful verification of the user login request, access the account credentials stored at the first computing system to access the first and second remote data storage services.

11. The non-transitory computer readable storage medium of claim 10, wherein to collect the information is further to:
retrieve the information from the first remote data storage service using the account credentials for the first remote data storage service; and
retrieve the information from the second remote data storage services using the account credentials for the second remote data storage service.

12. The non-transitory computer readable storage medium of claim 9, wherein said presentation comprises to filter the data display in view of the one or more labels and present the filtered data display in at least one of a list view, a thumbnail view, an icon view, or a menu view.

13. The non-transitory computer readable storage medium of claim 9, wherein said presentation comprises present the GUI in at least one of a file browser, a web browser, a viewing area of an application executing on the first computing system, or a main view of the display.

14. The non-transitory computer readable storage medium of claim 9, wherein each of the links refers to one of the plurality of data objects stored in the first computing system or stored remotely from the first computing system.

15. A computing system, comprising:
a data storage device; and
a processing device, operably coupled to the data storage device, to execute an inbox manager, wherein the processing device is to:
collect information about a plurality of data objects associated with activities of a user, wherein a first data object of the plurality of data objects is stored locally on the first computing system, a second data object of the plurality of data objects is stored remotely on a second computing system of a first remote data storage service, and a third data object of the plurality of data objects is stored remotely on a third computing system of a second remote data storage service;
receive account credentials associated with the user for the first and second remote data storage services;
store the account credentials in a secure data store of the first computing system;
assign one or more labels to the plurality of data objects in view of the information associated with the user, wherein the one or more labels comprise a new label;

generate a data display of a plurality of data items, wherein to generate the data display, further comprises to:
- merge the plurality of data items from the first and second remote data storage services into a single view for the user;
- organize the plurality of data items in view of the one or more labels assigned to the plurality of data objects associated with the user; and
- present the data display to a graphical user interface (GUI) of the first computing system, wherein said presentation of the data display via the GUI comprises generating a link for each of the plurality of data objects to be displayed in the GUI, and wherein each of the links comprise a path to a storage location where the respective data object is stored, and wherein each of the links comprise a mapping of an identifier of the respective data object and a Uniform Resource Identifier (URI) of the respective data object's location.

16. The computing system of claim 15, the processing device further to:
- receive a user login request, wherein the user login request comprises single sign-on credentials to access the account credentials stored in the secure data store;
- verify the user login request; and
- in response to successful verification of the user login request, access the account credentials stored at the first computing system to access the first and second remote data storage services.

17. The computing system of claim 16, the processing device further to:
- retrieve the information from the first remote data storage service using the account credentials for the first remote data storage service; and
- retrieve the information from the second remote data storage services using the account credentials for the second remote data storage service.

18. The computing system of claim 15, further comprising a database stored in the data storage device, and the processing device further to:
- maintain the information about the plurality of data objects in the database, wherein the information comprises a timestamp, an event, a reminder, access records, or history data for at least a data object of the plurality of data objects.

* * * * *